US012566417B2

(12) United States Patent
Zhu

(10) Patent No.: US 12,566,417 B2
(45) Date of Patent: *Mar. 3, 2026

(54) METHOD AND SYSTEM FOR PROVIDING PROGRAMMABLE MICROCONTROLLER UNIT (MCU) USING TWO-PHASE CONFIGURATION PROCESS

(71) Applicant: GOWIN Semiconductor Corporation, GuangZhou (CN)

(72) Inventor: Jinghui Zhu, San Jose, CA (US)

(73) Assignee: GOWIN SEMICONDUCTOR CORPORATION, Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,916

(22) Filed: Mar. 18, 2024

(65) Prior Publication Data

US 2024/0219877 A1     Jul. 4, 2024

Related U.S. Application Data

(63) Continuation of application No. 18/081,716, filed on Dec. 15, 2022, now Pat. No. 11,934,167, which is a continuation of application No. 16/988,534, filed on Aug. 7, 2020, now Pat. No. 11,550,281, which is a continuation-in-part of application No. 15/977,925, filed on May 11, 2018, now Pat. No. 10,789,197.

(60) Provisional application No. 62/505,554, filed on May 12, 2017.

(51) Int. Cl.
G06F 13/28     (2006.01)
G05B 19/042    (2006.01)
G06F 13/42     (2006.01)

(52) U.S. Cl.
CPC ....... *G05B 19/042* (2013.01); *G06F 13/4282* (2013.01); *G05B 2219/25257* (2013.01); *G06F 2213/0016* (2013.01)

(58) Field of Classification Search
CPC ........ G05B 19/042; G05B 2219/25257; G05B 19/0426; G06F 13/4282; G06F 2213/0016; Y02D 10/00
See application file for complete search history.

(56) References Cited

U.S. PATENT DOCUMENTS

| | | | | | |
|---|---|---|---|---|---|
| 6,973,658 | B2 * | 12/2005 | Nguyen | ................ | G06F 9/4411 |
| | | | | | 710/63 |
| 10,540,200 | B2 * | 1/2020 | Cheng | .................... | G06F 9/461 |
| 2013/0247073 | A1 * | 9/2013 | Keeney | .................. | G06F 9/455 |
| | | | | | 719/321 |

* cited by examiner

*Primary Examiner* — Henry Tsai
*Assistant Examiner* — Kim T Huynh
(74) *Attorney, Agent, or Firm* — JW Law Group; James M. Wu

(57)     ABSTRACT

One embodiment of the present invention discloses a two-phase configuration process ("TCP") to configure a field-programmable gate array ("FPGA") to include a configurable microcontroller unit ("CMU") during a phase I configuration and configuring the CMU during a phase II configuration. TCP, in one aspect, is able to receive first configuration data from a first external storage location via a communication bus. After storing the first configuration data in a first configuration memory for configuring FPGA to contain a CMU for the phase I configuration, second configuration data with MCU attributes is obtained from a second external storage location via the communication bus. The second configuration data is subsequently stored in a second configuration memory for programming the CMU for the phase II configuration.

22 Claims, 17 Drawing Sheets

700

730

702

706

800

802     806     808 cell1     cell2     cell3

A

812

B     810

816     O

C

818

1300

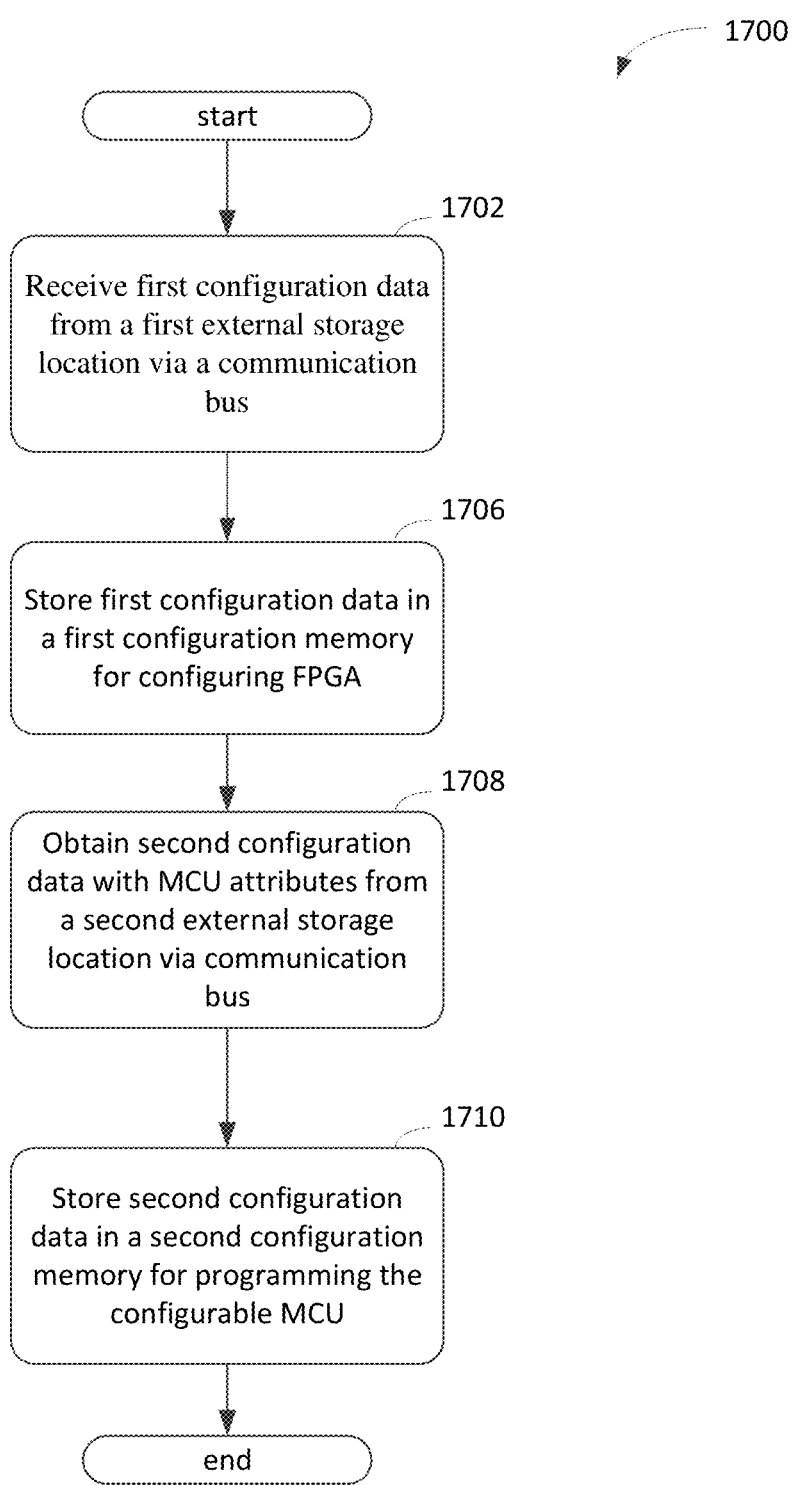

1700 start

1702

Receive first configuration data from a first external storage location via a communication bus

1706

Store first configuration data in a first configuration memory for configuring FPGA

1708

Obtain second configuration data with MCU attributes from a second external storage location via communication bus

1710

Store second configuration data in a second configuration memory for programming the configurable MCU end

FIG. 17

METHOD AND SYSTEM FOR PROVIDING PROGRAMMABLE MICROCONTROLLER UNIT (MCU) USING TWO-PHASE CONFIGURATION PROCESS

PRIORITY

This patent application is a continuation patent application of a co-pending U.S. patent application having a patent application Ser. No. 18/081,716, filed on Dec. 15, 2022, in the name of the same inventor and entitled "Method and Apparatus for Providing Programmable Microcontroller Unit (MCU) Using Two-Phase Configuration Process," issued into a U.S. patent with U.S. Pat. No. 11,945,167 on Mar. 19, 2024, which is a continuation patent application of U.S. patent application having a patent application Ser. No. 16/988,534, filed on Aug. 7, 2020 in the name of the same inventor and entitled "Method and Apparatus for Providing Programmable Microcontroller Unit (MCU) Using Two-Phase Configuration Process," issued into a U.S. patent with a U.S. Pat. No. 11,550,281 on Jan. 10, 2023, which is a continuation-in-part of U.S. patent application Ser. No. 15/977,925, filed on May 11, 2018 in the name of the same inventor and entitled "Method and Apparatus for Providing Programmable Microcontroller Unit (MCU)," issued into a U.S. patent with a U.S. Pat. No. 10,789,197 on Sep. 29, 2020, which further claims the benefit of priority based upon U.S. Provisional Patent Application Ser. No. 62/505,554, filed on May 12, 2017 in the name of the same inventor and entitled "Method and System for Providing Software Defined Microcontroller Unit," all of disclosures are incorporated herein by reference in their entirety.

FIELD

The exemplary embodiment(s) of the present invention relates to the field of computer hardware and software. More specifically, the exemplary embodiment(s) of the present invention relates to on-chip processor and/or microcontroller unit ("MCU").

BACKGROUND

With increasing popularity of network communication, artificial intelligence (AI), IoT (Internet of Things), and/or robotic control, the demand for more and faster data is constantly growing. To handle and facilitate voluminous data between electronic systems or computers, high speed interfaces components are typically required. To properly handle various different types of interface standards or protocols, various different types of microcontrollers ("MCUs") are generally employed.

A typical microcontroller ("MCU") contains one or more processors integrated in a single integrated circuit ("IC"). A conventional MCU includes memory devices and logical circuits used for embedded applications such as input/output ("IO") management. In application, MCU can be used in managing products and devices, such as automobile control systems, computer network systems, medical systems, remote controls, vehicle controls, robotic applications, machinery controls, office machines, appliances, power tools, toys and the like. Various different types of peripherals require diverse types of MCUs to handle various digital computing and/or network industry(s). Different peripherals may require MCUs in different environments, sensing and/or controlling electrical systems, industry control, automobile, network communications, and so on.

A drawback associated with typical MCUs is that, in general, a specific MCU configuration is required for a specific type of interface communication.

SUMMARY

One embodiment of the present invention discloses a two-phase configuration process ("TCP") to configure a field-programmable gate array ("FPGA") to include a configurable microcontroller unit ("CMU") during a phase I configuration and configuring the CMU during a phase II configuration. TCP, in one aspect, is able to receive first configuration data from a first external storage location via a communication bus. After storing the first configuration data in a first configuration memory for configuring FPGA to contain a CMU for the phase I configuration, second configuration data with MCU attributes is obtained from a second external storage location via the communication bus. The second configuration data is subsequently stored in a second configuration memory for programming the CMU for the phase II configuration.

CMU, in one aspect, includes a processor, I/O ports, and programmable microcontroller ("PM"). The processor is configured to communicate with a host central processing unit ("CPU") based on a set of predefined instruction code. The I/O ports are used to transmit information between the processor and an external device. The PM facilitates communication interfaces between the I/O ports and one or more external devices via one or more configurable communication standards selected by the PM in accordance with interface programming microcode.

Alternatively, an embodiment discloses a process for providing a CMU for identifying at least one embedded function. For example, after searching a bit map or software via a communication network for enabling the CMU to perform the embedded function, the bit map is downloaded via the communication network once the bit map is located. Once the CMU is programmed in response to the bit map, the embedded function performed by the CMU is verified in accordance with the downloaded bit map.

Additional features and benefits of the exemplary embodiment(s) of the present invention will become apparent from the detailed description, figures, and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 17 is a flowchart illustrating a process of programming a CMU using TCP in accordance with one embodiment of the present invention.

DETAILED DESCRIPTION

Figure 1:
FIG. 1 is a diagram illustrating a configurable microcontroller unit ("CMU") capable of providing communication interface based on programmable microcode in accordance with one embodiment of the present invention.
Figure 1:
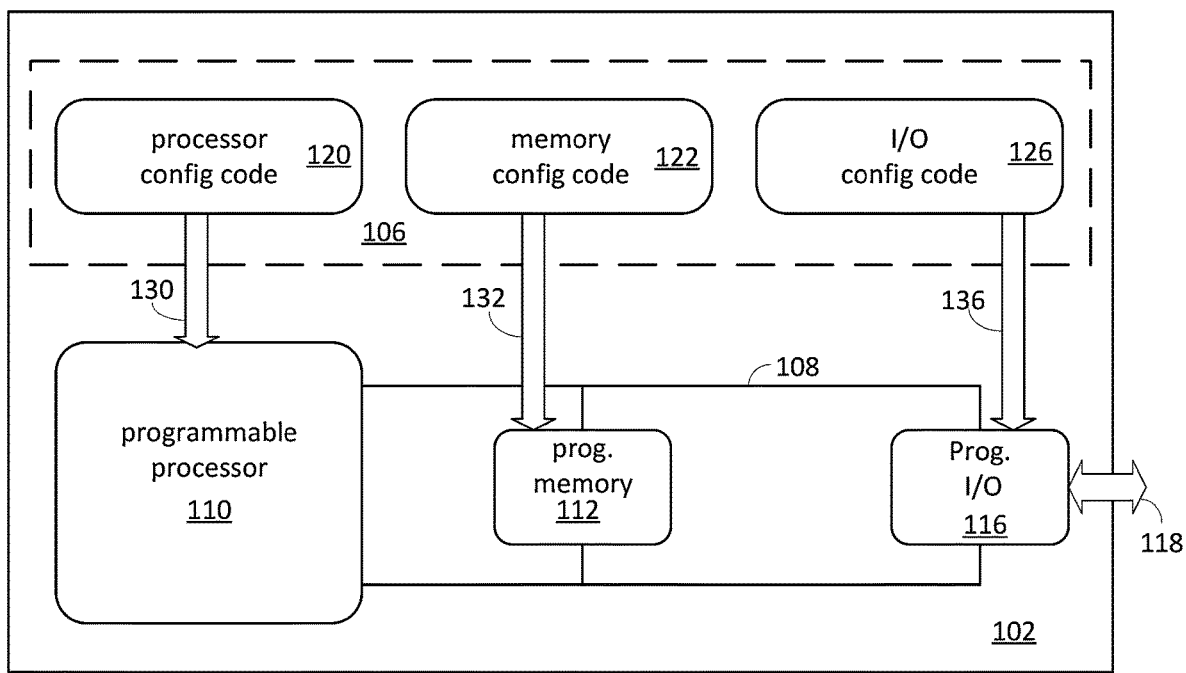

Embodiments of the present invention are described herein with the context of a method and/or apparatus for providing selectable interface managements via one or more configurable MCU(s).

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with an application- and business-related constraints and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field-programmable gate arrays (FPGAs), application-specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read-Only Memory), EEPROM (Electrically Erasable Programmable Read-Only Memory), FLASH Memory, JumpDrive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the present invention discloses a configurable microcontroller unit ("CMU") capable of providing one or more programmable input and output ("I/O") interfaces. The CMU includes a processor, I/O ports, and programmable microcontroller ("PM"). The processor is configured to communicate with a host central processing unit ("CPU") based on a set of predefined instruction code. The I/O ports are used to transmit information between the processor and an external device. The PM facilitates communication interfaces between the I/O ports and one or more external devices via one or more configurable communication standards selected by the PM in accordance with interface programming microcode.

Alternatively, an embodiment discloses a process for providing a configurable microcontroller unit ("CMU") for identifying at least one embedded function. For example, after searching a bit map or software via a communication network for enabling the CMU to perform the embedded function, the bit map is downloaded via the communication network once the bit map is located. Once the CMU is programmed in response to the bit map, the embedded function performed by the CMU is verified in accordance with the downloaded bit map.

FIG. 1 is a diagram 100 illustrating a configurable microcontroller unit ("CMU") 102 capable of providing a communication interface based on programmable microcode in accordance with one embodiment of the present invention. In one aspect, CMU 102 includes a programmable processor 110, programmable memory, programmable I/O component 116, and programming code storage 106. Programmable code storage 106, in one aspect, stores processor configuration code 120, memory configuration code 122, and I/O configuration code 126. It should be noted that the underlying concept of the exemplary embodiment(s) of the present invention would not change if one or more blocks (circuit or elements) were added to or removed from diagram 100.

Processor 110, in one aspect, is configurable based on the applications. For example, processor 110 can be programmed via programmable microcode stored in programmable code storage 106 to be able to execute ARM based instruction code. For instance, a programmable processor can be programmed or configured to be able to execute instructions in accordance with ARM, MIPS, X86, or PowerPC microcode. In an alternative embodiment, processor 110 is a regular processor or fixed processor (nonprogrammable) capable of managing programmable I/O component 116 and/or programmable memory 112. A benefit of having a programmable processor is that the programmable processor can provide additional flexibility to end-users.

Memory 112 can be a configurable or static memory device depending on the applications. In one embodiment, memory 112 is a programmable memory capable of being programmed based on the memory configuration code 122 stored in programmable code storage 106. For example, memory 112 can be programmed into multiple different storage capacities for handling different I/O ports. Alternatively, memory 112 can be programmed to use onboard flash memory, SRAM (Static random-access memory), and/or RAM depending on the applications as well as user's preferences. In an alternative embodiment, memory 112 can be static or regular memory devices which can be conventional flash memory, SRAM, RAM, or a combination of flash, SRAM, and RAM storage device.

I/O component 116, in one embodiment, includes a set of I/O ports and interface microcontroller. In one aspect, the interface microcontroller is a programmable microcontroller ("PM") based on I/O configuration code 126 in programmable code storage 106. A function of PM is to facilitate data communication or a peripheral interface between the external device(s) and processor 110 via the set of I/O ports. For example, the peripheral interfaces include, but not limited to, Inter-Integrated Circuit ("I²C"), Serial Peripheral Interface ("SPI"), universal asynchronous receiver/transmitter ("UART"), and the like. A benefit of employing the PM is that PM provides flexibility to CMU to handle multiple interface standards.

I²C, in one example, contains a multi-master, multi-slave, single-ended, and serial computer bus. An exemplary application of I²C is that it can be used for attaching lower-speed peripheral for short-distance and intra-board communication. The SPI bus is a synchronous serial communication interface specification used for short-distance communication, such as in embedded systems. In one example, SPI devices communicate in full-duplex mode using a master-slave architecture with a single master. The master device originates the frame for reading and writing. It should be noted that SPI can also be referred to as a four-wire serial bus, as opposed to three-, two-, and one-wire serial buses. UART is a computer hardware device for asynchronous serial communication in which the data format and transmission speeds may be configurable. In one example, some electric signaling levels and methods are handled by a driver circuit external to the UART.

Programmable code storage 106, in one embodiment, is used to store programming microcode for programming programmable devices such as programmable processor 110, programmable memory 112, and/or programmable I/O component 116. In one aspect, storage 106 divides its memory space into three portions for storing processor configuration code 120, memory configuration code 122, and I/O configuration code 126. Alternatively, storage 106 contains processor configuration memory for storing processor configuration code 120, memory configuration memory for storing memory configuration code 122, and/or I/O configuration memory for storing I/O configuration code 1126.

It should be noted that configuration codes such as code 120-126 can be obtained from a user, cloud, and/or providers.

A function of CMU 102, in one embodiment, is to provide programmable I/O interfaces using a processor 110, I/O ports 118, and PM. The processor is configured to communicate with a host central processing unit ("CPU"), not shown in FIG. 1, based on a set of predefined instruction code. Processor 110, in one aspect, is a programmable processor capable of including hard macro or macrocode operable to selectively execute instruction sets based on Advanced RISC (reduced instruction set computing) Machine ("ARM"), Million Instructions Per Second ("MIPS"), Argonaut RISC Core ("ARC"), X86, or Power in accordance with processor programmable code.

The I/O ports 118 are used to transmit information between the processor and an external (or peripheral) device. For example, one or more I/O ports are configured to couple to multiple external devices via one or more buses. The different bus operates under the different bus or interface standards. For instance, the standards include, but not limited to, analog comparator protocol, A/D converter protocol, LCD interface protocol, USART protocol, SPI protocol, and/or TWI protocol.

The PM which is coupled to the processor facilitates communication interfaces between I/O ports 118 and one or more external devices via at least one of several configurable communication standards selected by the PM in accordance with interface programming microcode such as I/O configuration code 126. In one embodiment, the PM includes multiple programmable interfaces configured to facilitate communication between I/O ports 118 and one or more external devices in accordance with the interface programming microcode. The programmable interfaces, in one example, are configured to utilize an inter-integrated circuit ("I2C") to facilitate communication between I/O ports 118 and external device(s) in accordance with the set of predefined programming microcode. The programmable interfaces can also be configured to employ serial peripheral interface ("SPI") bus protocol to facilitate communication between I/O ports 118 and external device(s). The programmable interfaces, in another example, are configured to utilize universal asynchronous receiver-transmitter ("UART") interface protocol to facilitate communication between I/O ports 118 and external devices. Alternatively, the programmable interfaces can also be configured to utilize Integer ("Int") interface protocol to facilitate communication between I/O ports 118 and an external device(s) based on predefined programming microcode. Furthermore, the programmable interfaces are configured to utilize a two-wire interface ("TWI") protocol to facilitate communication between I/O ports 118 and one or more external devices according to programming microcode. Also, the programmable interfaces are configured to utilize the Timer interface protocol to facilitate communication between the I/O ports and one or more external devices in response to a set of predefined programming microcode.

CMU 102, in one aspect, further includes a memory coupled to the processor and configured to store the predefined programming microcode downloadable from a cloud system. The memory, in one example, includes flash memory for storing downloaded bitmaps from a remote location via a communication network. The memory may include a static random-access memory ("SRAM") for storing data. The SRAM, for example, is a configurable storage device capable of setting a programmable bandwidth in accordance with memory programmable-code. In one aspect, a portion of the memory is configurable capable of being configured to one of a single port and dual port in accordance with memory programmable-code.

An advantage of employing a CMU over a traditional MCU is that CMU provides programmability thereby CMU can facilitate multiple different peripheral interface protocols based on the microcode.

Figure 2:
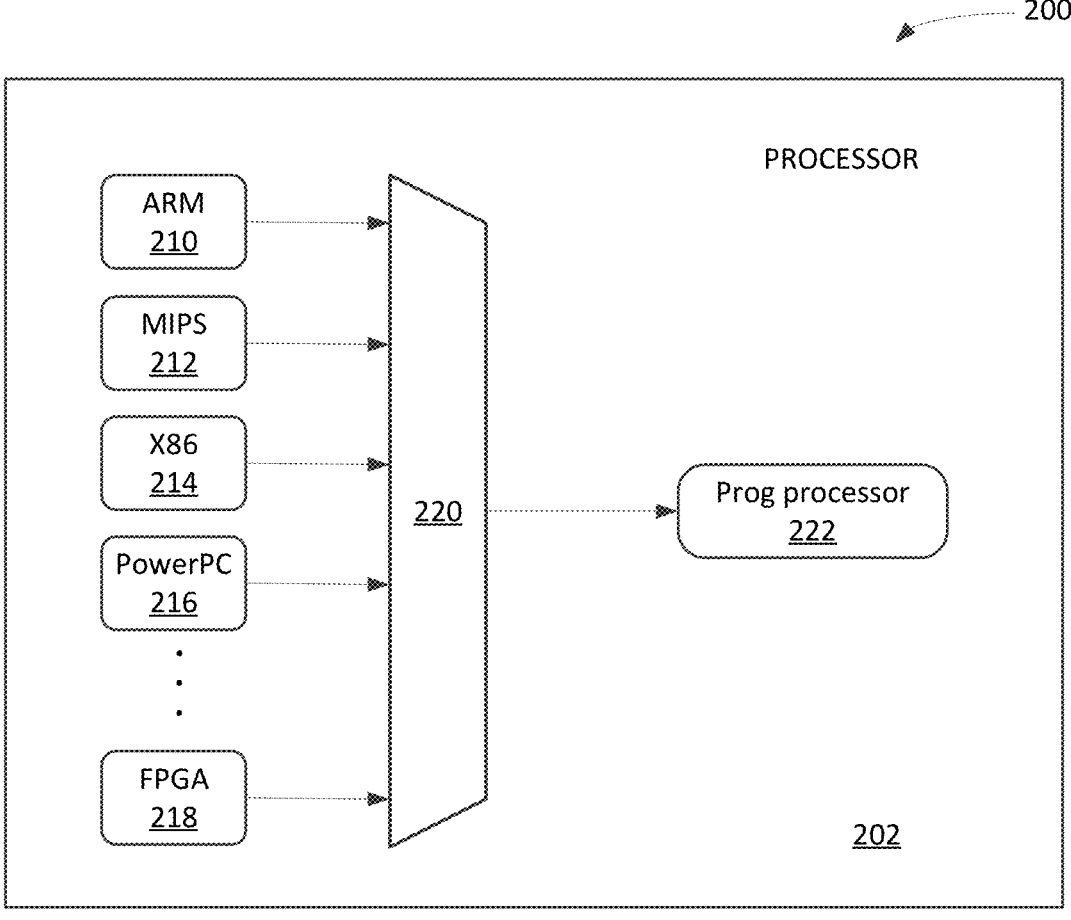
FIG. 2 is a block diagram illustrating a programmable processor used in CMU in accordance with one embodiment of the present invention.

FIG. 2 is a block diagram 200 illustrating a programmable processor 202 used in CMU in accordance with one embodiment of the present invention. Processor 202, in one embodiment, includes programmable processor 222, selecting logic 220, ARM core 210, MIPS core 212, X86 core, PowerPC core 216, and FPGA core 218. It should be noted that core refers to software or firmware microcode capable of programming programmable processor 222 into one of ARM, MIPS, X86, PowerPC, or other FPGA logic depending on which one of cores 210-218 is selected. It should be noted that the underlying concept of the exemplary embodiment(s) of the present invention would not change if one or more blocks (circuit or elements) were added to or removed from diagram 200.

Figure 3:
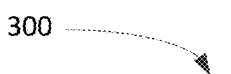
FIG. 3 is a block diagram illustrating a CMU with programmable ports in accordance with one embodiment of the present invention.
Figure 3:
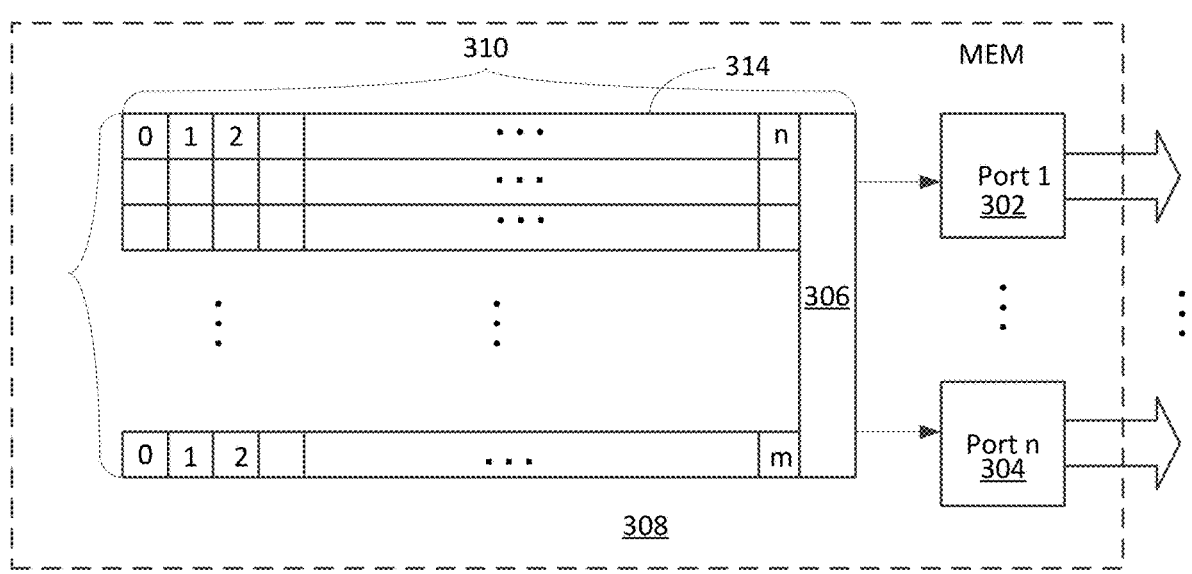

FIG. 3 is a block diagram 300 illustrating a memory device 308 with programmable ports in accordance with one embodiment of the present invention. Memory device 308, in one embodiment, can be a programmable memory or static nonprogrammable memory such as regular flash memory or SRAM. In one aspect, device 308 includes a set of ports 302-304, memory array 310 with n bits and m rows, and configurable logic 306. Configurable logic 306, in one embodiment, manages or controls the size of storage capacity for a single port as well as a dual-port. It should be noted that the underlying concept of the exemplary embodiment(s) of the present invention would not change if one or more blocks (circuit or elements) were added to or removed from diagram 300.

It should be noted that memory 308 can be SRAM using hard macro while, in some cases, it is configurable. For example, memory 308 can be configured with a single port or dual port. Alternatively, the data width can be programmed to 8, 16, and/or 32 bits wide. In addition, the depth of array can also be configurable to a range of 1K, 2K, 16K, 32K, and the like. Memory 308 can also be flash memory with hard macro having access behavior just as SRAM. In one example, FLASH and/or SRAM can be accessed by CPU in one memory addressing scheme which makes it just like ordinary MCU's SRAM and/or FLASH scheme.

Figure 4:
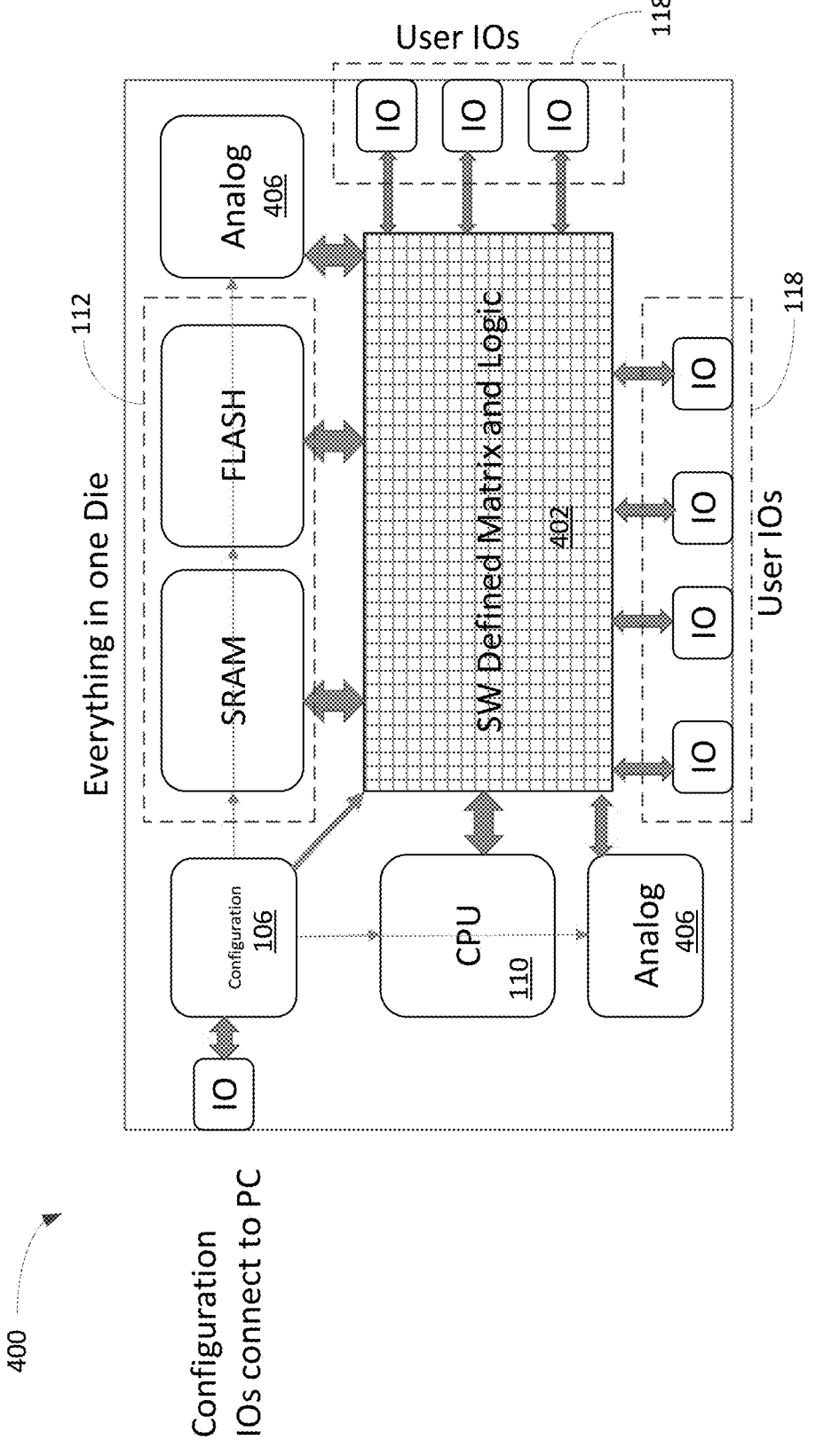
FIGS. 4-6 are block diagrams illustrating a CMU containing a programmable microcontroller ("PM") in accordance with one embodiment of the present invention.

FIG. 4 is a block diagram 400 illustrating a CMU containing a programmable microcontroller ("PM") in accordance with one embodiment of the present invention. Diagram 400 includes a processor or CPU 110, memory 112, I/O ports 118, programming code storage 106, and PM 402. Programmable code storage 106 also known as configuration component stores processor configuration code for programming PM, processor 110, and/or memory 112. It should be noted that the underlying concept of the exemplary embodiment(s) of the present invention would not change if one or more blocks (circuit or elements) were added to or removed from diagram 400.

PM 402, in one embodiment, is configured to provide peripheral data communication between external or peripheral devices and a host computer using a software-defined matrix and logic ("SDML"). In one aspect, SDML is a programmable logic capable of performing certain tasks based on microcode. An exemplary SDML is similar to a field-programmable gate array ("FPGA") or programmable logic device ("PLD") in which the logic or integrated circuit ("IC") is required to be programmed before it can be used. For example, PM 402 can be programmed to facilitate communication using the I²C bus standard. Alternatively, PM 402 is programmed to allow a portion of I/O ports to operate the SPI bus standard while another portion of I/O ports to operate the UART interface protocol. PM 402, in one aspect, can be programmed to facilitate communication using I2C, SPI, UART, integer another integer ("Int"), two-wire interface ("TWI"), and/or timer interface.

An advantage of using PM 402 is that PM 402 is flexible and it can be programmed to handle various interfaces for an MCU. Another advantage of using PM 402 is that it allows a user to update, delete, and/or added interface protocols after the CMU is installed in a system.

Figure 5:
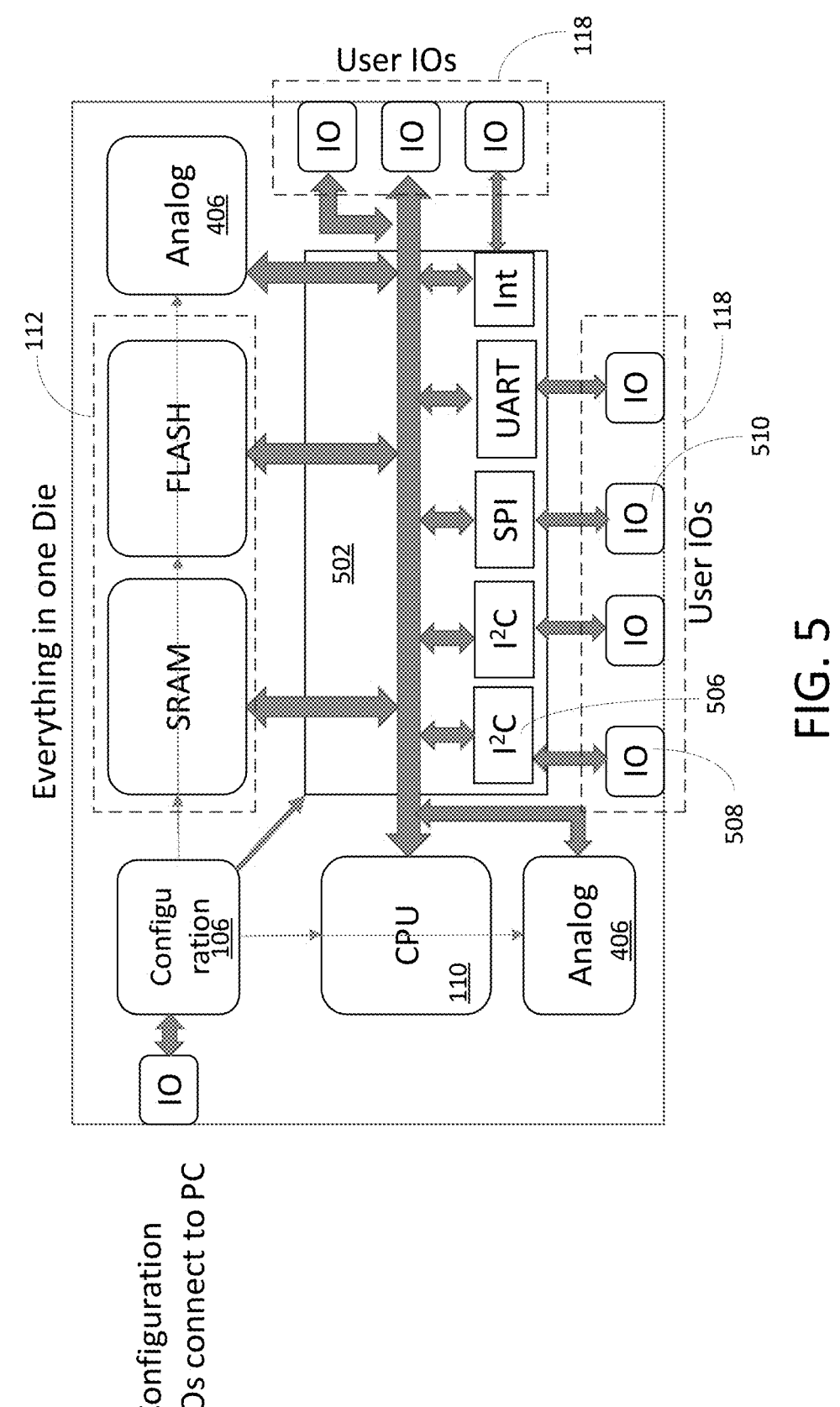

FIG. 5 is a block diagram 500 illustrating a CMU containing a programmable microcontroller ("PM") in accordance with one embodiment of the present invention. Diagram 500 which is similar to diagram 400 shown in FIG. 4 includes a processor or CPU 110, memory 112, I/O ports 118, programming code storage 106, and PM 502. Programmable code storage 106 also known as configuration component stores processor configuration code for programming PM, processor 110, and/or memory 112. It should be noted that the underlying concept of the exemplary embodiment(s) of the present invention would not change if one or more blocks (circuit or elements) were added to or removed from diagram 500.

PM 502, in one embodiment, is a configurable device capable of providing peripheral data communication between external or peripheral devices and a host computer using one of I²C, SPI, UART, and Int. PM 502 is organized with some fixed core such as block 506 plus some software-defined logic or core. In one aspect, PM 502 is capable of selecting an interface block to be used for data communication. The microcode, in one example, can be provided by the user or provider via a remote location. For example, PM 502 can program block 506 to handle communication between I/O point 508 and processor 110.

An advantage of using PM 502 is that it provides flexibility while reducing the complexity of programmable logic.

Figure 6:
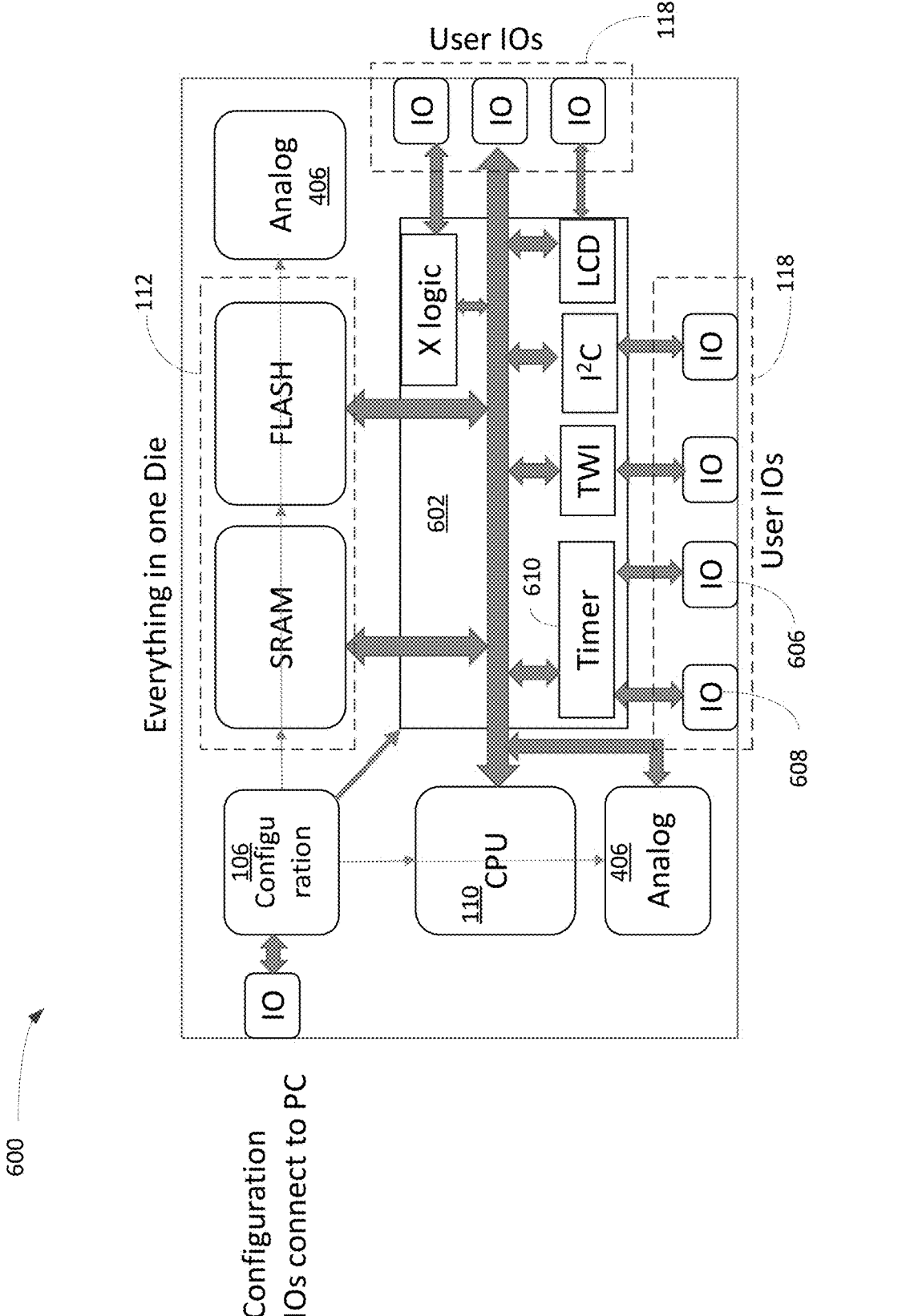

FIG. 6 is a block diagram 600 illustrating a CMU containing a programmable microcontroller ("PM") in accordance with one embodiment of the present invention. Diagram 600 which is similar to diagram 500 shown in FIG. 5 includes a processor or CPU 110, memory 112, I/O ports 118, programming code storage 106, and PM 602. Programmable code storage 106 also known as configuration component stores processor configuration code for programming PM, processor 110, and/or memory 112. It should be noted that the underlying concept of the exemplary embodiment(s) of the present invention would not change if one or more blocks (circuit or elements) were added to or removed from diagram 600.

PM 602, which is similar to PM 502 shown in FIG. 5, is a configurable device capable of providing peripheral data communication between external or peripheral devices and a host computer using one of Timer, TWI, I²C, LCD, and/or other X logic(s). PM 602 is organized with some fixed core such as block 610 plus some software-defined logic or core. In one aspect, PM 602 is capable of selecting an interface block to be used for data communication. The microcode, in one example, can be provided by the user or provider via a remote location. For example, PM 602 can program block 610 to handle communication between I/O ports 606-608 and processor 110.

An advantage of using PM 602 is that it provides flexibility using hard macro and programmable logic.

In one aspect, CMU essentially offers an MCU hardware platform with one mainstream CPUs, such as ARM, MIPS, x86, etc. wherein the components are defined by a downloadable configuration file. When a user chooses certain configurations such as different sizes of SRAM, FLASH Memory, different peripheral or different numbers of ports, the specific configuration file can be downloaded from a cloud. A benefit is to allow users to make their product decision with the flexibility of hardware design. Another benefit is that the configurable MCU or CMU is upgradable even after the CMU is shipped. Also, by offering a common platform, hardware fabrication and/or resources are reduced.

For SW Defined MCU components, CMU can have a programmable CPU and programmable I/O component. CPU or processor can be Hard Macro which can be ARM, MIPS, ARC, X86, and Power P C, et cetera. A reason to choose the Hard Macro is that the MCU architectures are converging. Hard Macro giving the most efficiency on performance and power balance which is a cost-effective approach. I/O component can also be a hard Macro to provide input and output of CMU. In one example, the IO standard can be configurable to support different IO standards such as LVCMOS3.3, SSTL2.5, SSTL1.8, etc.

Figure 7:
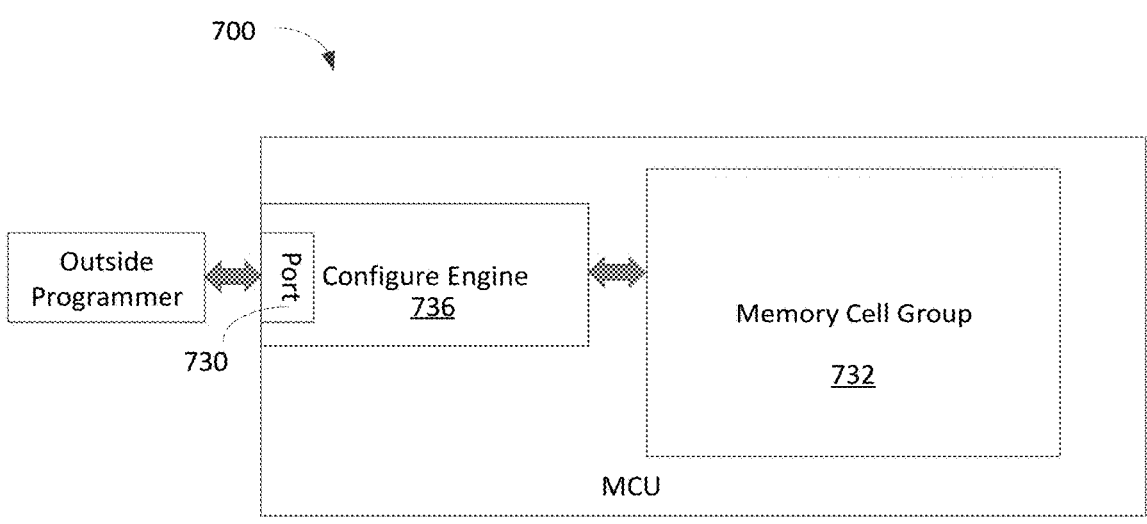
FIG. 7 is a block diagram illustrating a memory structure used in CMU in accordance with one embodiment of the present invention.
Figure 7:
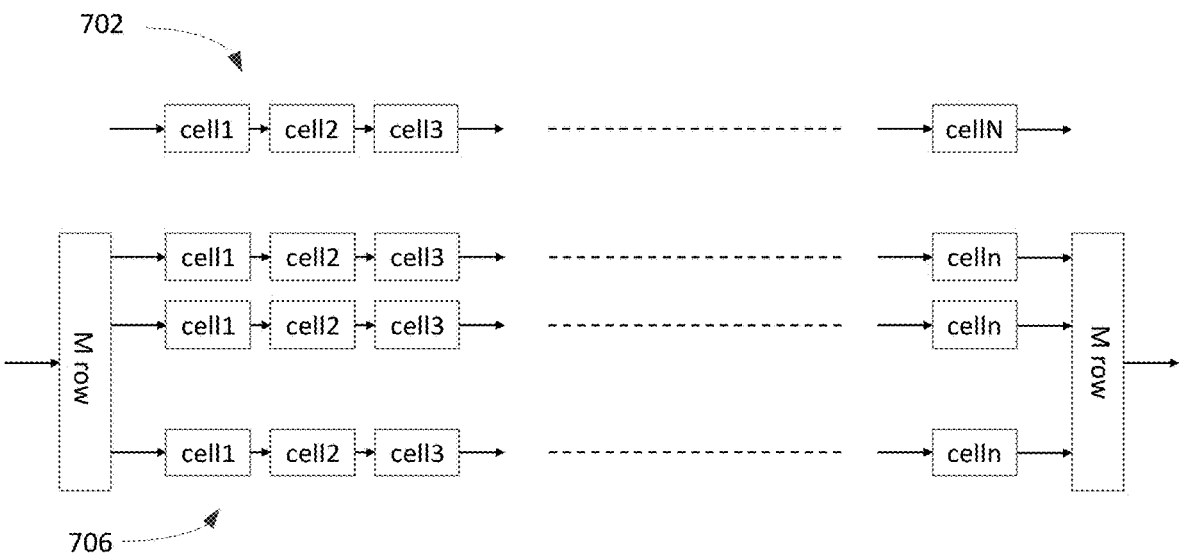

FIG. 7 is a block diagram illustrating a memory structure used in CMU in accordance with one embodiment of the present invention. Diagram 700 illustrates a configurable MCU or CMU capable of receiving programming or configuration code from outside of CMU via a port 730. Upon receipt of the configuration code or microcode, the code is stored in a memory cell group 732. It should be noted that the underlying concept of the exemplary embodiment(s) of the present invention would not change if one or more blocks (circuit or elements) were added to or removed from diagram 700.

Diagram 700 further includes a configuration engine 736 which is used to program the programmable devices based on received code. In one aspect, configure engine 736 is coupled to memory cells 732. Interface port 730 to the outside programmer, PC, or ATE (automatic test equipment) is connected to data buses with one or more bus protocols, such as Jtag, I²C, SPI, and/or data bus connecting to a CPU. It should be noted that configure engine 736 receives data from an interface and transmits data to a memory cell.

Diagram 702 illustrates one-dimensional memory cells organized in a series wherein the data within the series is shifted from one to next based on clock cycles. In one example, memory cells can be 6T SRAM cells or Non-volatile Memory cells. Diagram 706 illustrates two-dimensional memory cells as a normal SRAM array. In one example, each memory cell can send out one control signal with value as either "0" or "1". The data is shifted from one to next.

It should be noted that SW Defined Matrix and Logic or SDML refers to a matrix that can be formed with both connections and logic. The outputs of memory cells determine the formed connection and logic. The logic can be predefined in Hard Macro and subsequently, the memory cell selects user desired logic. The more advanced method can use programmable logic such as GAL, CPLD's Macro, or FPGA's Look Up Table and Registers.

Figure 8:
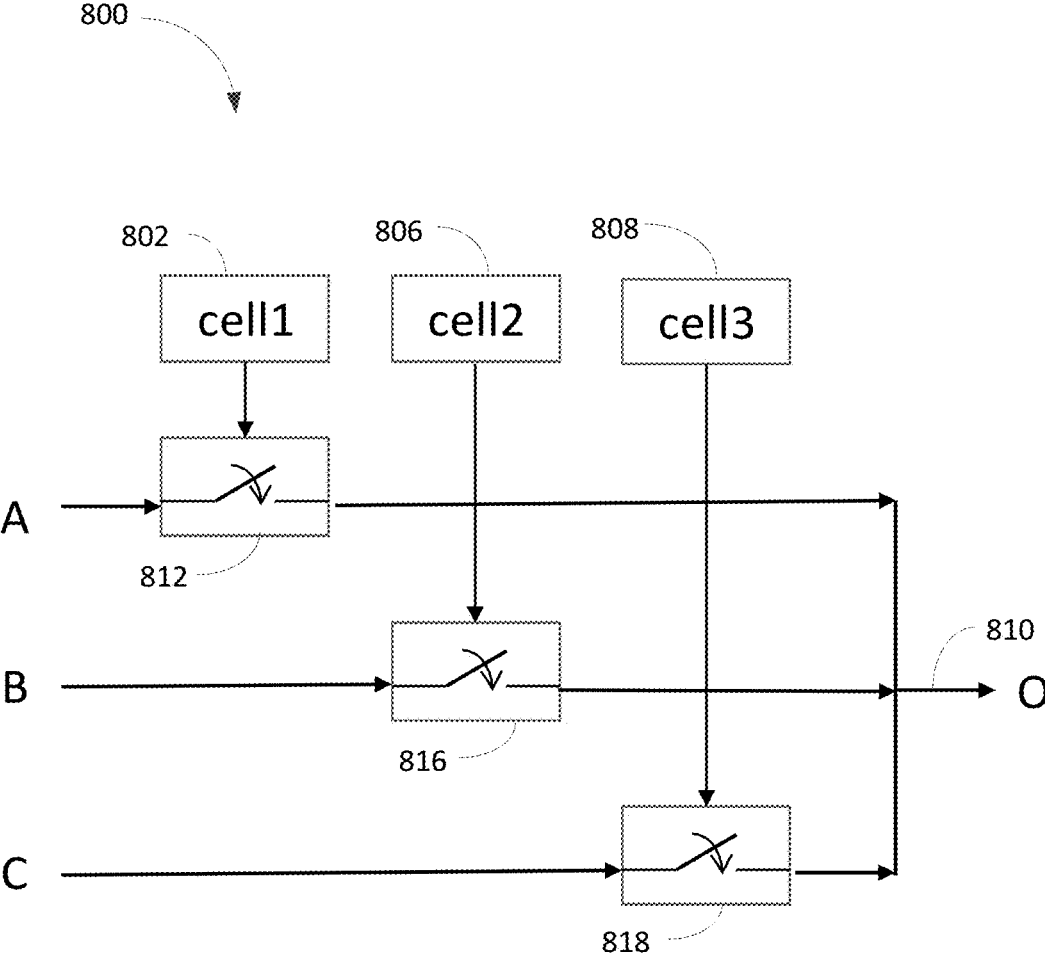
FIG. 8 is a block diagram illustrating configurable switchers for programming PM in accordance with one embodiment of the present invention.

FIG. 8 is a block diagram 800 illustrating a configurable switcher for programming PM in accordance with one embodiment of the present invention. Diagram 800 includes three cells 802-808, three switches 812-818, three input lines A, B, C, and one output line 810. Switch 812 controls whether the data on input line A should go through to output line 810 and switch 816 controls whether the data on input line B should go through to output line 810. Also, switch 818 controls whether the data on input line C should go to output line 810. To determine which data on the input line should be the output line 810, the values in cells 802-808 determine which switch should be on. For example, if cell 2 806 has an on-logic value, switch 816 should be on and the data on input line B should pass through to output line 810. In one aspect, cells such as cells 802-808 and switches 812-818 are used to form connections and logics in PM.

For example, if cell output is 1, the switch will be on. Otherwise, it will be off. Assume A is an I²C output, B is a timer output, and C is SPI output. By making Cell value as "0" or "1", the user can choose which Hard Macro will be used and output to O.

Figure 9:
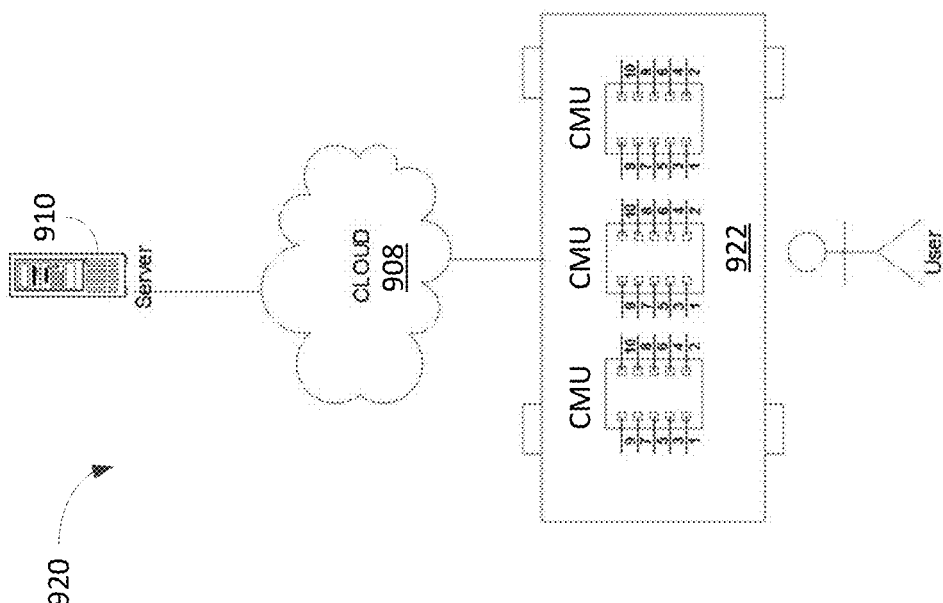
FIGS. 9-10 are block diagrams illustrating a process of programming a CMU via a cloud in accordance with one embodiment of the present invention.
Figure 9:
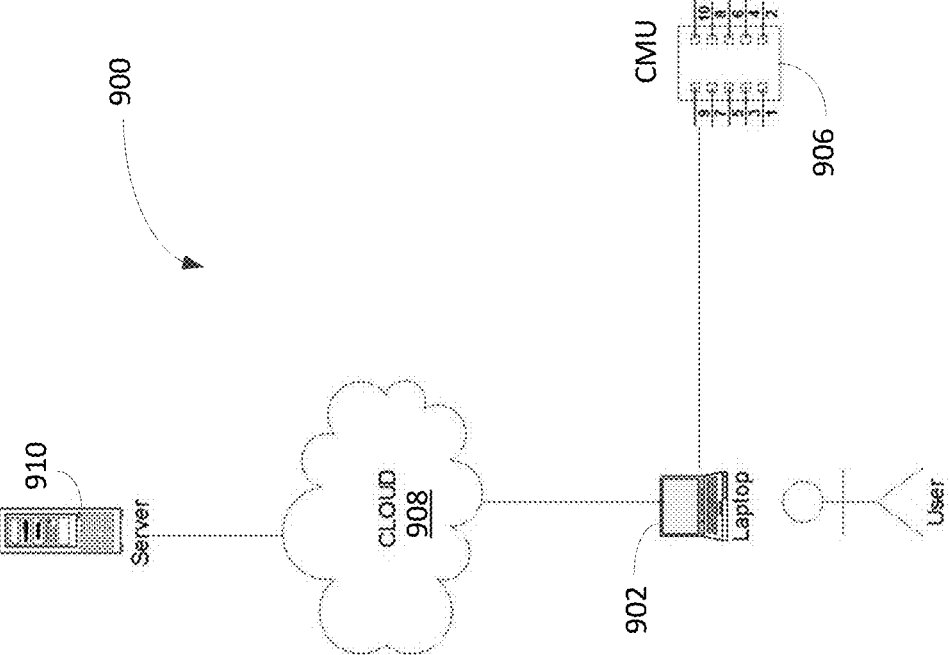

FIG. 9 is a block diagram illustrating a process of programming a CMU via a cloud in accordance with one embodiment of the present invention. Diagram 900 includes a laptop 902, CMU 906, cloud 908, and server 910. In one embodiment, server 910 stores configuration file(s) wherein server 910 can be a vendor server. Laptop computer 902 which is controlled by a user is able to download a configuration file from server 910 via cloud 908. The configuration file is subsequently used to program MCU 906 which is connected to laptop computer 902. In one aspect, laptop computer 902 is able to search a configuration file via online providers for configuring CMU 906 to the user's desire.

Diagram 920 includes automatic test equipment ("ATE") 922, cloud 908, and server 910 wherein ATE houses multiple CMUs. ATE 922 is used to facilitate volume production in which it can program multiple CMUs simultaneously. Upon downloading configuration files or configuration microcode from vendor server 910, ATE is able to program CMUs based on the downloaded configuration file concurrently.

Figure 10:
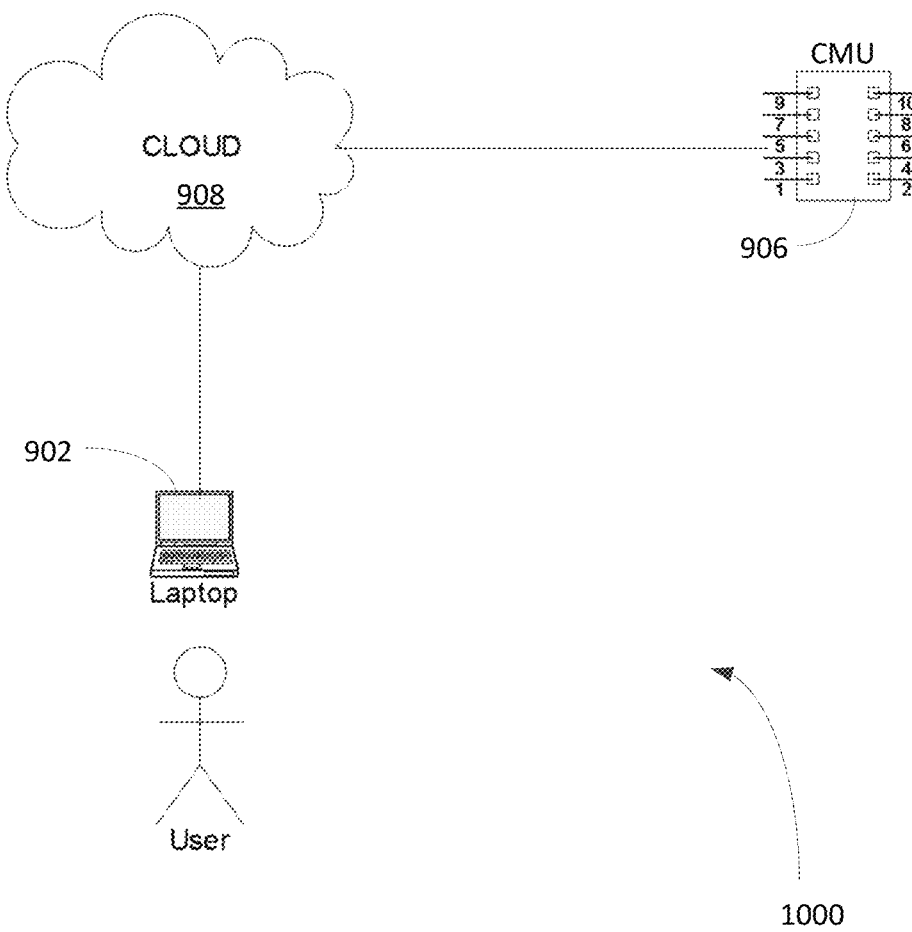

FIG. 10 is a block diagram illustrating a process of programming a CMU via a cloud in accordance with one embodiment of the present invention. Diagram 1000 includes a laptop computer 902, cloud 908, and CMU 906 wherein laptop computer 902 is coupled to CMU 906 via cloud 908. In one aspect, laptop computer 902 is capable of configuring CMU 906 via cloud 908 through a process of configuration operation remotely. It should be noted that the underlying concept of the exemplary embodiment(s) of the present invention would not change if one or more blocks (circuit or elements) were added to or removed from diagram 1000.

The exemplary embodiment of the present invention includes various processing steps, which will be described below. The steps of the embodiment may be embodied in machine or computer-executable instructions. The instructions can be used to cause a general-purpose or special-purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 11:
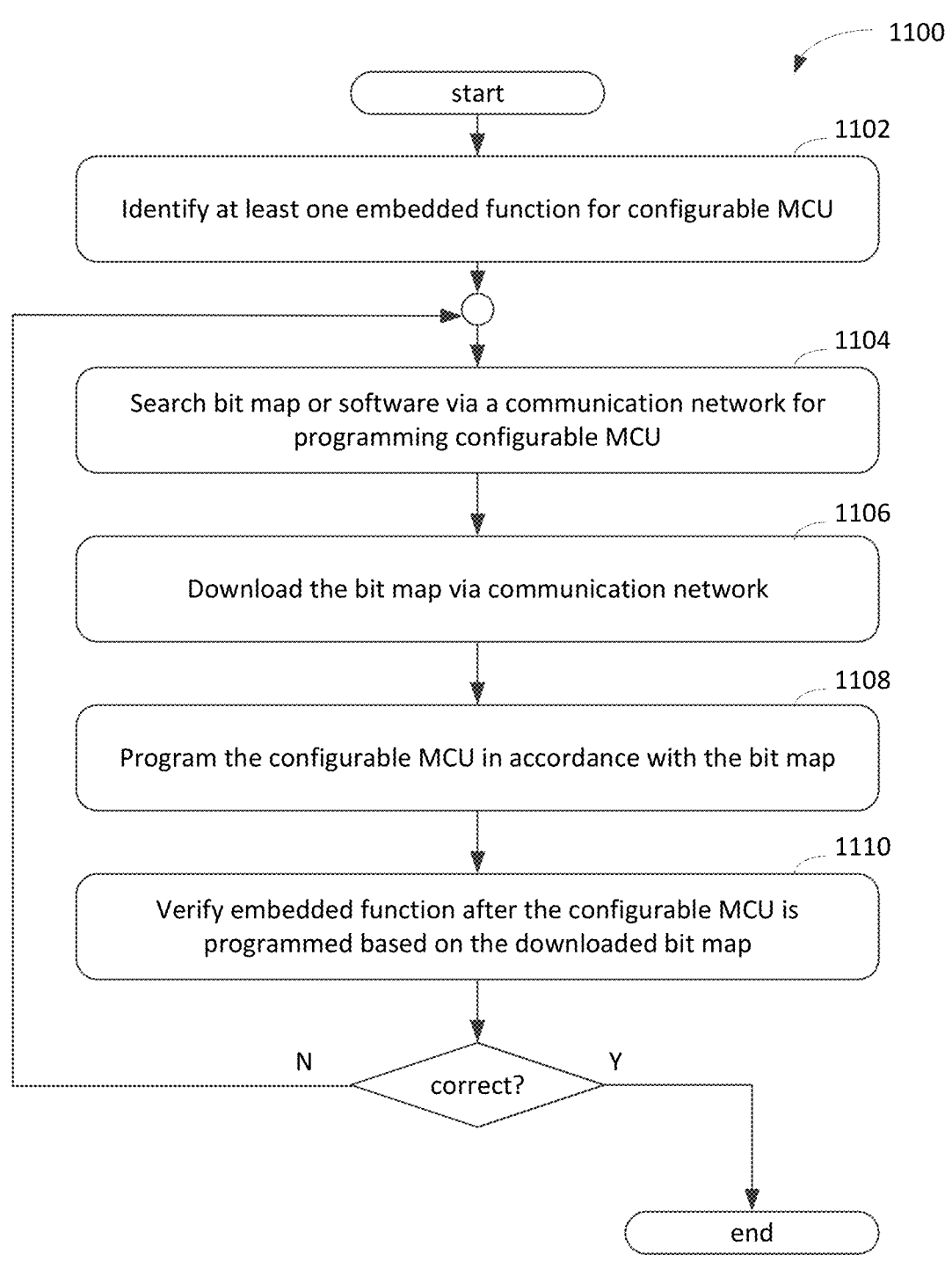
FIG. 11 is a flowchart illustrating a process of programming a CMU using downloaded bit map in accordance with one embodiment of the present invention.

FIG. 11 is a flowchart 1100 illustrating a process of programming a CMU using downloaded bit map in accordance with one embodiment of the present invention. At block 1102, a process or method capable of providing a CMU identifies a first embedded function of a configurable MCU for facilitating network interface between a host and an external device based on a first interface protocol. For example, an I²C interface function is determined for communicating with at least one external device. Alternatively, a universal asynchronous receiver-transmitter ("UART") interface function is determined for communicating with at least one external device.

At block 1104, after searching a first bit map via a communication network for programming the configurable MCU to perform the first embedded function, the first bit map, at block 1106, is downloaded from a cloud system via the communication network once the first bit map is located. It should be noted that the configurable MCU is the same or similar to CMU.

At block 1108, upon programming the configurable MCU in response to the first bit map, the first embedded function at block 1110 is verified once the configurable MCU is programmed. In one embodiment, the first bit map is stored in a local storage memory. The process is further able to search a new bit map associated with the first embedded function for programming the configurable CMU if the first bit map fails to verify the first embedded function performed by the configurable CMU. In one aspect, after identifying a second embedded function of the configurable CMU for facilitating network interface between a host and an external device based on a second interface protocol, the second bit map is downloaded from the cloud system via the communication network. The process programs or configures configurable MCU in response to the second bit map.

It should be noted that the inter-integrated circuit ("I²C") is a multi-master, multi-slave, single-ended, serial computer bus. It is usually employed for attaching lower-speed peripheral ICs to processors and microcontrollers in short-distance, intra-board communication.

Alternatively, a Serial Peripheral Interface ("SPI") bus is a synchronous serial communication interface specification used for short-distance communication, primarily in embedded systems. SPI bus can be used in digital cards and/or liquid crystal displays. SPI devices can communicate in dual-mode using the master-slave architecture with a master. For example, the master device provides the frame for reading and writing while several slave devices can be supported via selections with individual slave select (SS) lines.

Figure 12:
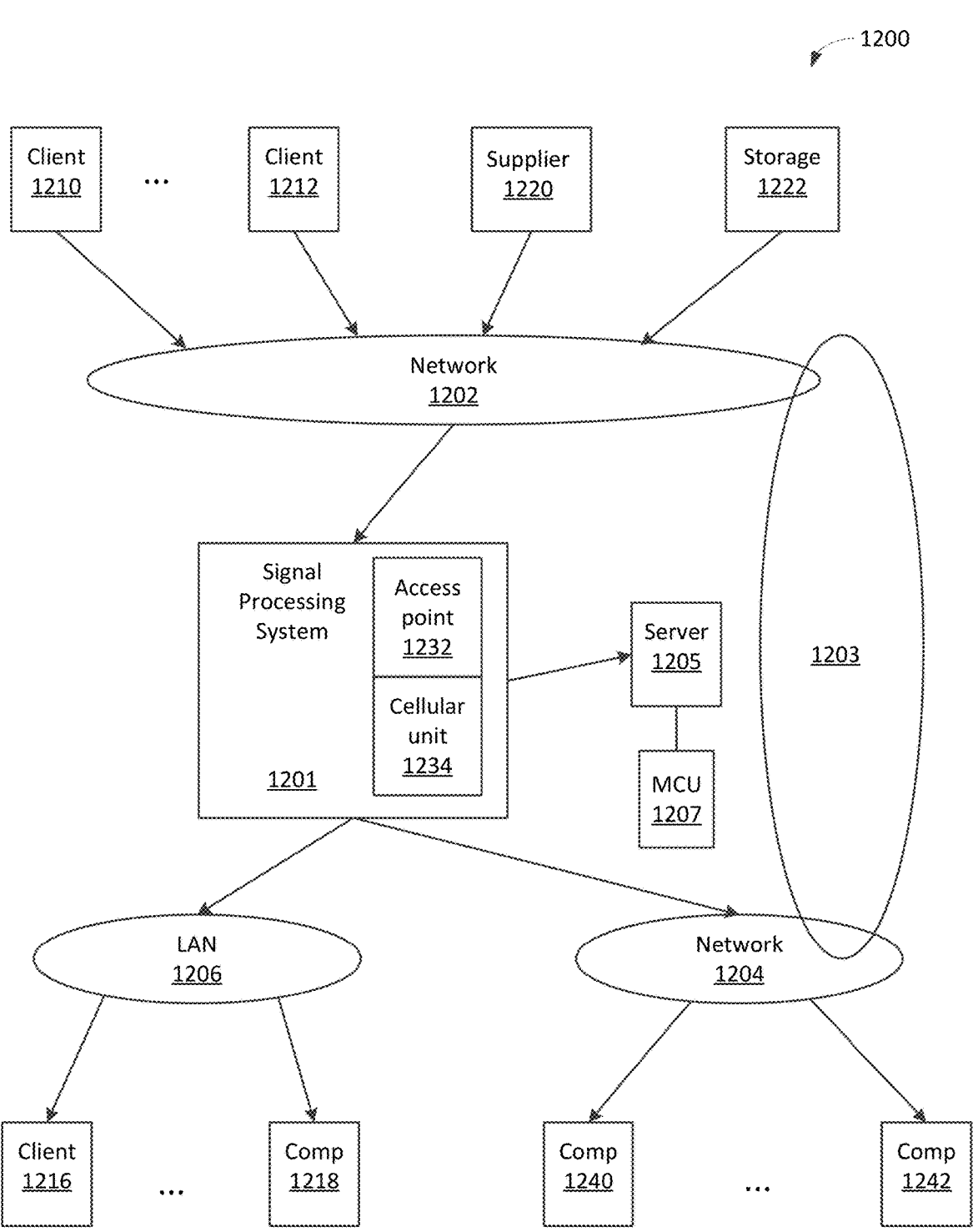
FIG. 12 is a diagram illustrating a computer network capable of providing embedded function via CMU in accordance with one embodiment of the present invention.

FIG. 12 is a diagram illustrating a computer network capable of providing embedded function via configurable MCU in accordance with one embodiment of the present invention. In this network environment, a system 1201 is coupled to a wide-area network 1202, LAN 1206, Network 1201, and server 1204. Wide-area network 1202 includes the Internet, or other proprietary networks including America On-Line™, SBC™, Microsoft Network™, and Prodigy™. Wide-area network 1202 may further include network backbones, long-haul telephone lines, Internet service providers, various levels of network routers, and other means for routing data between computers.

Server 1204 is coupled to wide-area network 1202 and is, in one aspect, used to route data to clients 1210-1212 through a local-area network ("LAN") 1206. Server 1204 is coupled to storage device 1222 to enhance overall memory efficiency.

The LAN connection allows client systems 1210-1212 to communicate with each other through LAN 1206. Using conventional network protocols, USB portable system 1230 may communicate through wide-area network 1202 to client computer systems 1210-1212, supplier system 1220, and storage device 1222. For example, client system 1210 is connected directly to wide-area network 1202 through direct or dial-up telephone or other network transmission lines. Alternatively, clients 1210-1212 may be connected through wide-area network 1202 using a modem pool.

Having briefly described one embodiment of the computer network in which the embodiment(s) of the present invention operates, FIG. 12 illustrates an example of a computer system, which uses one or more configurable and/or programmable MCUs.

Figure 13:
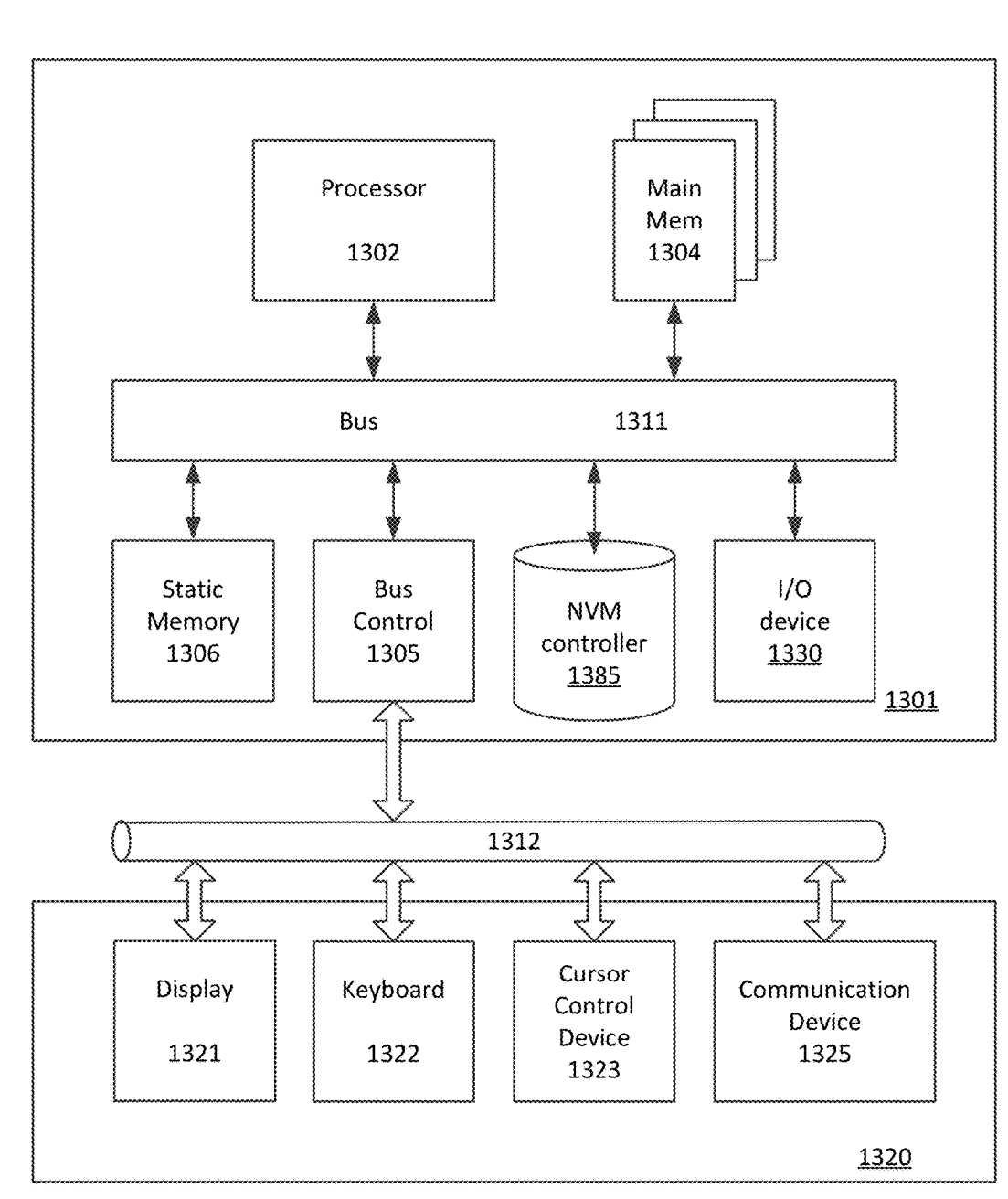
FIG. 13 is a block diagram illustrating a digital processing system or component capable of processing and/or executing instruction used in CMU in accordance with one embodiment of the present invention.

FIG. 13 is a block diagram illustrating a digital processing system capable of using the configurable CMU in accordance with one embodiment of the present invention. Computer system 500 can include a processing unit 1301, an interface bus 1312, and an input/output ("IO") unit 1320. Processing unit 1301 includes a processor 1302, a main memory 1304, a system bus 1311, a static memory device 1306, a bus control unit 1305, an I/O element 1330, and an NVM controller 1385. It should be noted that the underlying concept of the exemplary embodiment(s) of the present invention would not change if one or more blocks (circuit or elements) were added to or removed from FIG. 12.

Bus 1311 is used to transmit information between various components and processor 1302 for data processing. Processor 1302 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 1304, which may include multiple levels of cache memories, stores frequently used data and instructions. Main memory 1304 may be RAM (random access memory), MRAM (magnetic RAM), or flash memory. Static memory 1306 may be a ROM (read-only memory), which is coupled to bus 1311, for storing static information and/or instructions. Bus control unit 1305 is coupled to buses 1311-1312 and controls which component, such as main memory 1304 or processor 1302, can use the bus. Bus control unit 1305 manages the communications between bus 1311 and bus 1312. Mass storage memory or SSD 106, which may be a magnetic disk, an optical disk, hard disk drive, floppy disk, CD-ROM, and/or flash memories are used for storing large amounts of data.

I/O unit 1320, in one embodiment, includes a display 1321, keyboard 1322, cursor control device 1323, and communication device 1325. Display device 1321 may be a liquid crystal device, cathode ray tube ("CRT"), touchscreen display, or other suitable display devices. Display 1321 projects or displays images of a graphical planning board. Keyboard 1322 may be a conventional alphanumeric input device for communicating information between computer system 500 and computer operator(s). Another type of user input device is cursor control device 1323, such as a conventional mouse, touch mouse, trackball, or other types of the cursor for communicating information between system 1300 and user(s).

Communication device 1325 is coupled to bus 1311 for accessing information from remote computers or servers, such as server 1004 or other computers, through wide-area network 1202. Communication device 1325 may include a modem or a network interface device, or other similar devices that facilitate communication between computer 1300 and the network. Computer system 1300 may be coupled to some servers 1204 via a network infrastructure such as the infrastructure illustrated in FIG. 12.

In an alternative embodiment, a two-phase configuration process ("TCP") capable of configuring an FPGA to be a CMU(s) is disclosed. During a phase I configuration process, FPGA is programmed to include one or more CMUs and during a phase II configuration process, CMU is configured to include one or more user-defined MCU functionalities. TCP, in one aspect, is able to receive first configuration data from a first external storage location via a communication bus. After storing the first configuration data in a first configuration memory for configuring FPGA to contain a CMU for the phase I configuration, second configuration data with MCU attributes is obtained from a second external storage location via the communication bus. The second configuration data is subsequently stored in a second configuration memory for programming the CMU for the phase II configuration.

Figure 14:
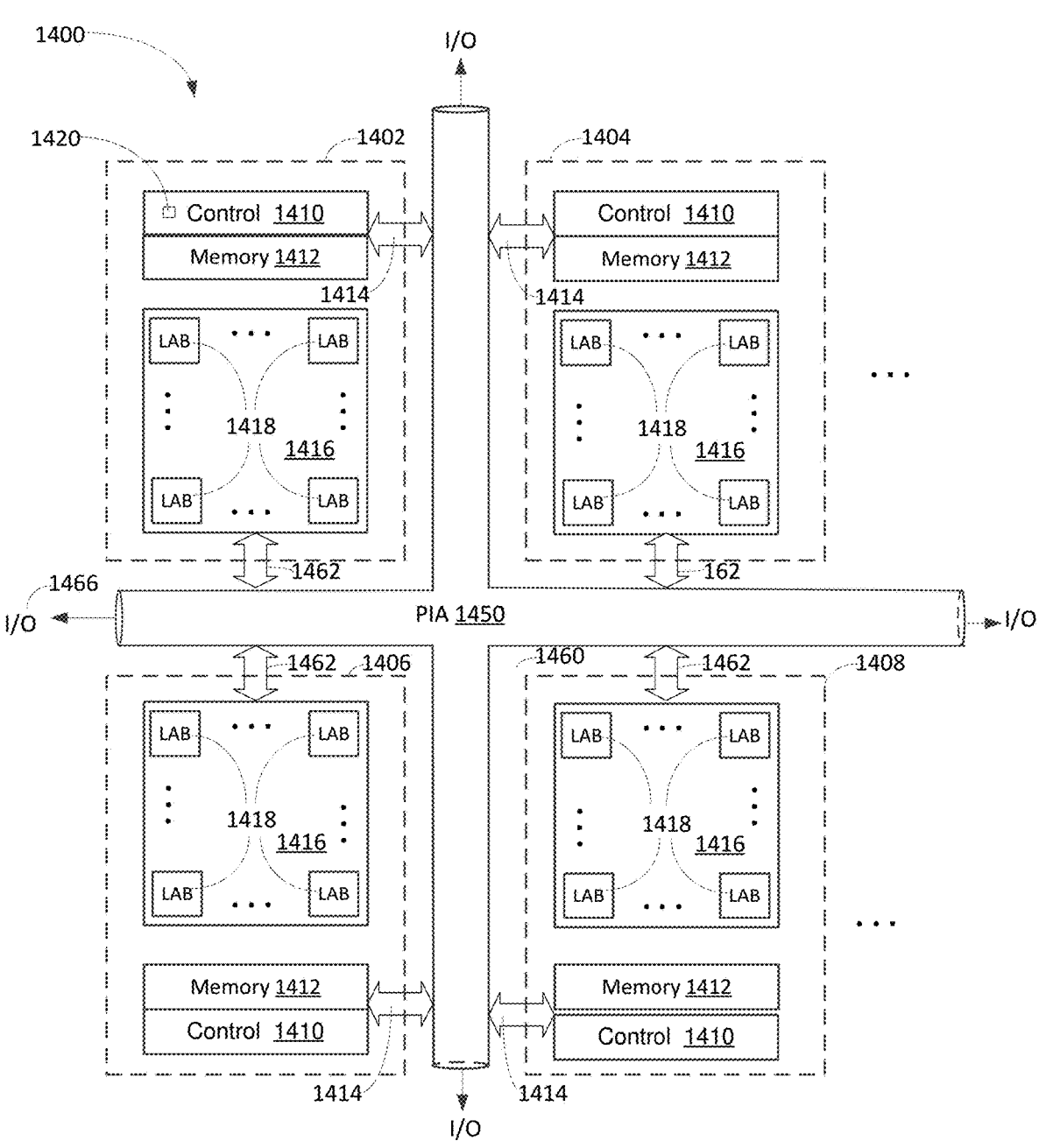
FIG. 14 is a block diagram illustrating a programmable semiconductor device ("PSD") or FPGA able to include a CMU via a two-phase configuration process ("TCP") in accordance with one embodiment of the present invention.

FIG. 14 is a block diagram 1400 illustrating a programmable semiconductor device ("PSD") or FPGA capable of including a CMU via TCP in accordance with one embodiment of the present invention. To simplify the foregoing discussion, the terms "PSD", "PIC", FPGA, and PLD are referring the same or similar devices and they can be used interchangeably hereinafter. Diagram 1400 includes multiple PPRs 1402-1408, PIA 1450, and regional I/O ports 1466. PPRs 1402-1408 further includes control units 1410, memory 1412, and LBs 1416. Note that control units 1410 can be configured into one single control unit, and similarly, memory 1412 can also be configured into one single memory for storing configurations. It should be noted that the underlying concept of the exemplary embodiment(s) of the present invention would not change if one or more blocks (circuit or elements) were added to or removed from diagram 1400.

LBs 1416, also known as configurable function unit ("CFU") include multiple LABs 1418 which is also known as a configurable logic unit ("CLU"). Each LAB 1416, for example, can be further organized to include, among other circuits, a set of programmable logical elements ("LEs"), configurable logic slices ("CLS"), or macrocells, not shown in FIG. 14. Each LAB, in one example, may include anywhere from 32 to 512 programmable LEs. I/O pins (not shown in FIG. 14), LABs, and LEs are linked by PIA 1450 and/or other buses, such as buses 1462 or 1414, for facilitating communication between PIA 1450 and PPRs 1402-1408.

Each LE includes programmable circuits such as the product-term matrix, lookup tables, and/or registers. LE is also known as a cell, configurable logic block ("CLB"), slice, CFU, macrocell, and the like. Each LE can be independently configured to perform sequential and/or combinatorial logic operation(s). It should be noted that the underlying concept of PSD would not change if one or more blocks and/or circuits were added or removed from PSD.

Control units 1410, also known as configuration logics, can be a single control unit. Control unit 1410, for instance, manages and/or configures individual LE in LAB 1418 based on the configuring information stored in memory 1412. It should be noted that some I/O ports or I/O pins are configurable so that they can be configured as input pins and/or output pins. Some I/O pins are programmed as bi-directional I/O pins while other I/O pins are programmed as unidirectional I/O pins. The control units such as unit 1410 are used to handle and/or manage PSD operations in accordance with system clock signals.

LBs 1416 include multiple LABs that can be programmed by the end-user(s). Each LAB contains multiple LEs wherein each LE further includes one or more lookup tables ("LUTs") as well as one or more registers (or D flip-flops or latches). Depending on the applications, LEs can be configured to perform user-specific functions based on a predefined functional library facilitated by the configuration software. PSD, in some applications, also includes a set fixed circuit for performing specific functions. For example, the fixed circuits include, but not limited to, a processor(s), a DSP (digital signal processing) unit(s), a wireless transceiver(s), and so forth.

PIA 1450 is coupled to LBs 1416 via various internal buses such as buses 1414 or 1462. In some embodiments, buses 1414 or 1462 are part of PIA 1450. Each bus includes channels or wires for transmitting signals. It should be noted that the terms channel, routing channel, wire, bus, connection, and interconnection are referred to as the same or similar connections and will be used interchangeably herein. PIA 1450 can also be used to receive and/or transmits data directly or indirectly from/to other devices via I/O pins and LABs.

Memory 1412 may include multiple storage units situated across a PPR. Alternatively, memories 1412 can be combined into one single memory unit in PSD. In one embodiment, memory 1412 is an NVM storage unit used for both configurations as well as user memory. The NVM storage unit can be, but not limited to, MRAM, flash, Ferroelectric RAM, and/or phase changing memory (or chalcogenide RAM). Depending on the applications, a portion of the memory 1412 can be designated, allocated, or configured to be a block RAM ("BRAM") used for storing large amounts of data in PSD.

A PSD includes many programmable or configurable LBs 1416 that are interconnected by PIA 1450, wherein each programmable LB is further divided into multiple LABs 1418. Each LAB 1418 further includes many LUTs, multiplexers, and/or registers. During configuration, a user programs a truth table for each LUT to implement a desired logical function. It should be noted that each LAB, which can be further organized to include multiple logic elements ("LEs"), can be considered as a configurable logic cell ("CLC") or slice. For example, a four-input (16 bit) LUT receives LUT inputs from a routing structure (not shown in FIG. 14). Based upon the truth table programmed into LUT during configuration of PSD, a combinatorial output is generated via a programmed truth table of LUT in accordance with the logic values of LUT inputs. The combinatorial output is subsequently latched or buffered in a register or flip-flop before the clock cycle ends.

In one embodiment, control unit 1410 includes an MBC module 1420. It should be noted that MBC module 1420 can be placed anywhere within PIC or PSD for facilitating the MBC process. A function of MBC module 1420 is to control a configuration or rebooting process using user-defined configuration data or default configuration data ("DCD"). A benefit of using the MBC process is to recover or restore PIC or PSD from corrupted or incorrect configuration data.

Depending on the applications, an FPGA can be programmed to contain one or more CMUs via phase I configuration data stored in the first configuration memory. An advantage of using TCP is that once an FPGA is configured to emulate a CMU by a hardware engineer, a software engineer, for example, is able to program the CMU to perform user-defined MCU functions.

Figure 15:
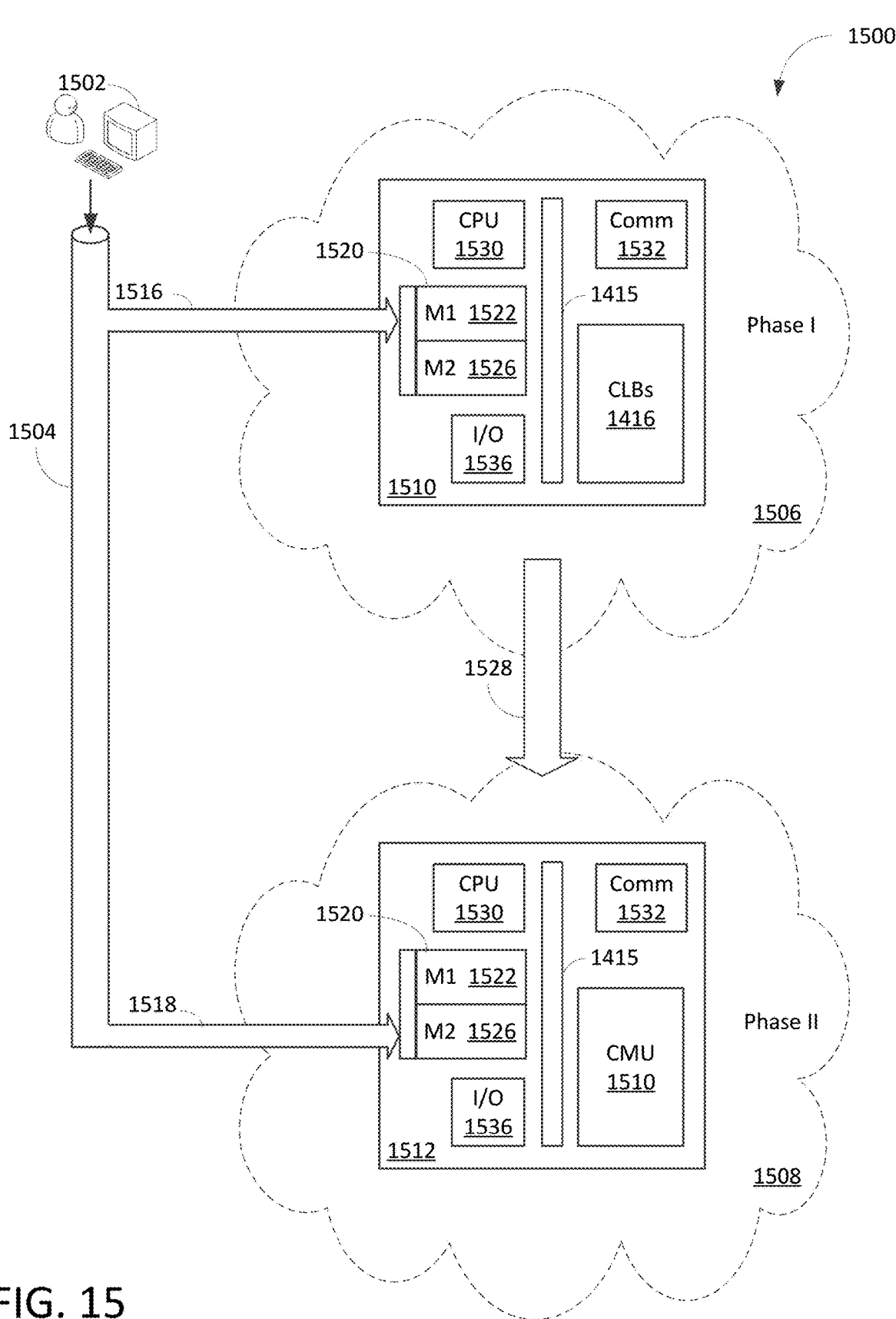
FIG. 15 is a block diagram illustrating a logic process of TCP in accordance with one embodiment of the present invention.

FIG. 15 is a block diagram 1500 illustrating a logic process of TCP in accordance with one embodiment of the present invention. Diagram 1500 includes a user 1502, phase I configuration 1506, and phase II configuration 1508. In one aspect, user 1502, who can include a group of engineers or customers, is coupled to phase I configuration 1506 and phase II configuration 1508 via a bus or communication channel 1504. It should be noted that the underlying concept of the exemplary embodiment(s) of the present invention would not change if one or more blocks (circuit or elements) were added to or removed from diagram 1500.

Phase I configuration 1506 includes a PLD 1510 which is configured or programmed to contain at least one CMU capable of processing and performing MCU functions. PLD 1510, in one embodiment, includes an embedded processor 1530, multiple CLBs, I/O block 1536, communication block 1532, and a memory block 1520. Memory block 1520, in one aspect, is organized into two portions wherein a first portion M1 is designated to a first configuration memory 1522 and a second portion M2 is designated to a second configuration memory 1526. In one example, I/O block 1536 includes multiple I/O pins used to communicate with external devices. Communication block 1532, which could be part of I/O block 1536, is used to communicate with remote devices or systems using one or more existing communication networks, such as wireless networks, Bluetooth networks, or other types of communication networks.

Embedded processor 1530 is used to perform logic functions based on instruction sets. Embedded processor 1530 can be software processors, hardware processors, or a combination of software and hardware processors. For example, embedded processor 1530 can be hard macro operable to selectively execute instruction sets based on Advanced RISC (reduced instruction set computing) Machine ("ARM"), Million Instructions Per Second ("MIPS"), Argonaut RISC Core ("ARC"), X86, Ryzen processor, or Power PC in accordance with processor programmable code.

CLBs 1416 can be further divided into LUTs, which can be programmed to perform user-defined logic functions. CLBs 1416, for example, are configured to behave as a device of CMU having multiple programmable interfaces for facilitating communications between I/O ports and one or more external devices via at least one of several configurable communication standards. It should be noted that the user-defined characteristic of CMU is defined by a set of predefined programming microcode stored in second configuration memory 1526.

Memory block 1520, in one embodiment, is an embedded flash memory wherein a portion of the embedded flash memory M1 to be first configuration memory 1522 for housing PLD configuration data and the second portion of embedded flash memory M2 to be second configuration memory 1526 for housing CMU configuration data. In one embodiment, flash memory is organized to be randomly accessible memory referenced by addresses. For example, first configuration memory 1522 stores the PLD configuration data for configuring PLD 1510 to function or emulate as a CMU. The second configurable memory 1526 stores the CMU configuration data for programming the CMU. Alternatively, memory block 1520 can be a static random-access memory ("SRAM") wherein a portion of the SRAM is configured to be the first configuration memory 1522 for facilitating the PLD configuration process and a second portion of the SRAM is configured to be the second configuration memory 1526 for facilitating the CMU configuration process. In yet another embodiment, memory block 1520 includes a combination of volatile and nonvolatile memory for handling first and the second configuration memories 1522-1526.

Phase I configuration 1506 includes an FPGA configuration process using hardware description languages ("HDLs") such as Verilog or VHDL to configure FPGA to including at least one CMU. For example, after the first phase configuration process, FPGA 1510 behaves as a CMU. In operation, user 1502 sends configuration data coded with HDLs to first configuration memory 1522 via communication channel 1516 which is part of bus 1504. It should be noted that communication channels 1516-1518 are the same bus 1504 during the different phases. It should be noted that communication channel 1516 is bus 1504 during phase I configuration process and communication channel 1518 is bus 1504 during the phase II configuration process.

After verifying FPGA that contains a CMU via a set of predefined verification process, the process proceeds to phase II configuration 1508 as indicated by numeral 1528. Phase II configuration 1508, in one embodiment, indicates that FPGA or PLD 1512 has been configured into a CMU. For example, phase II configuration 1508 facilitates a programming environment using assembly language, such as but not limited to C, Python, and JavaScript, for configuring embedded MCU and/or embedded systems When user 1502 provides assembly language as the second configuration data for configuring CMU via communication channel 1518, CMU such as PLD 1512 is programmed to use inter-integrated circuit ("I2C") as an interface to facilitate communication between I/O ports and one or more external devices in accordance with the set of predefined programming microcode. Alternatively, the CMU is programmed to use serial peripheral interface ("SPI") bus protocol to facilitate communication between the I/O ports and one or more external devices in accordance with the interface programming microcode. In another embodiment, the CMU is programmed to use an improved Inter-Integrated Circuit ("I3C") bus protocol to facilitate communication between the I/O ports and one or more external devices in accordance with the interface programming microcode. Furthermore, the CMU can also be programmed to use universal asynchronous receiver-transmitter ("UART"), Integer ("Int"), two-wire interface ("TWI"), or Timer interface protocol to facilitate communication between the plurality of I/O ports and one or more external devices in accordance with the interface programming microcode.

Figure 16:
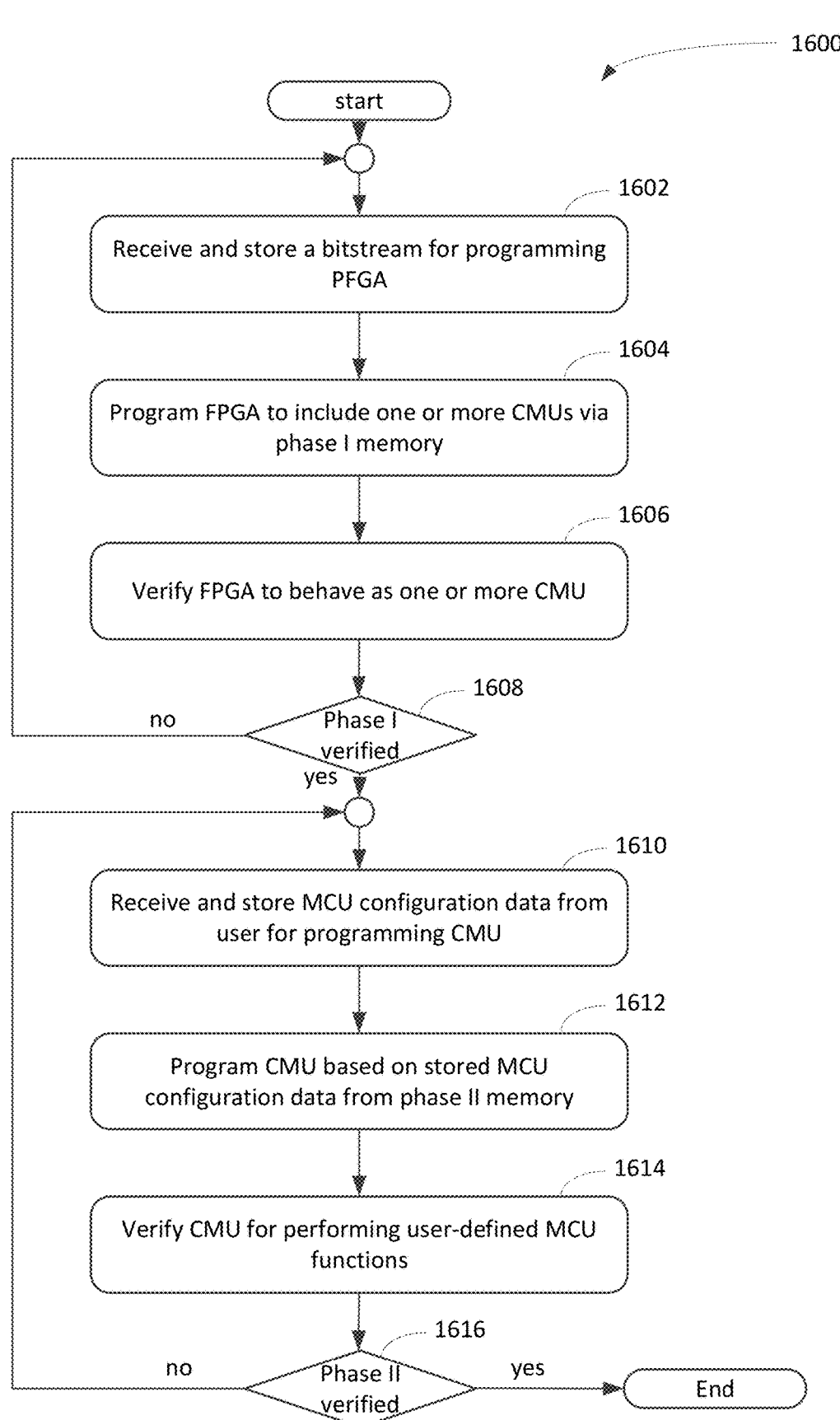
FIG. 16 is a flowchart illustrating a process of TCP for facilitating a configuration process of CMU in accordance with one embodiment of the present invention.

FIG. 16 is a flowchart 1600 illustrating a process of TCP for facilitating a configuration process of CMU in accordance with one embodiment of the present invention. At block 1602, the process retrieves the first configuration data or FPGA configuration data from a first configuration memory for configuring FPGA. At block 1604, FPGA is configured to behave or emulate as one or more configurable MCUs in accordance with the first configuration data. At block 1604, the process activates a verification process to verify or confirm the functionality of FPGA. For example, the verification process ascertains that FPGA is behaving as a CMU.

At block 1608, the process checks to see if the verification process verifies the functionality of FPGA, which emulates a CMU, the process proceeds to block 1602 if the verification process fails. Otherwise, the process proceeds to block 1610 upon completion of phase I (or first phase or FPGA) configuration. After receiving and storing the MCU configuration data provided by a user, the second configuration data is subsequently retrieved from the second configuration memory. At block 1612, the CMU is configured in accordance with the second configuration data for performing one or more user-defined MCU logic functions. At block 1614, the process verifies the functionalities of CMU. At block 1616, the process examines to see whether the phase II configuration is successful. If the phase II configuration is failed, the process proceeds to block 1610 to continue configuring the CMU. Otherwise, the process proceeds to the end block if the second phase (or phase II or CMU) configuration is successful upon verifying that the CMU performs the user-defined functions. The process, for example, is also capable of identifying a first embedded function of CMU such as an interface protocol for facilitating communication between a host and an external device. For instance, the embedded function includes, but not limited to, an inter-integrated circuit ("I²C") interface function or an improved Inter-Integrated Circuit ("I3C") interface function for communicating with at least one external device.

An advantage of using TCP is that it allows a first user to use hardware language to program an FPGA to emulate a CMU and a second user to use assembly language to program the CMU to perform user-defined MCU functions.

FIG. 17 is a flowchart 1700 illustrating a process of programming a CMU using TCP in accordance with one embodiment of the present invention. At block 1702, a process of TCP capable of configuring FPGA and CMU receives first configuration data from a first external storage location via a communication bus. The first configuration data, in one example, is FPGA configuration information coded in HDLs for programming the FPGA to emulate a CMU.

At block 1706, the first configuration data is stored in a first configuration memory for configuring FPGA to contain at least one CMU. In one aspect, the FPGA includes a local flash memory wherein a portion of the flash memory is allocated to the first configuration memory for storing FPGA configuration data while another portion of the flash memory is allocated to the second configuration memory for storing CMU configuration data. For example, the local flash memory can store a first bit map or first bitstream provided by a first user for configuring either FPGA or CMU.

At block 1708, the second configuration data that includes MCU attributes or functionalities is obtained or received from a second external storage location via the communication bus. In one example, the second configuration data can also be referred to as MCU configuration data. The MCU configuration data, for example, contains information relating to transmission bandwidth and speed, bi-direction or unidirectional transmission, communication protocols, and the like.

At block 1710, the second configuration data is stored in the second configuration memory for programming CMU. In one aspect, a phase I (or first phase) configuration includes programming FPGA to behave as an MCU or CMU via FPGA configuration data stored in the first configuration memory. Upon configuring an FPGA into a CMU, the CMU can be further configured by the user. For example, the process is capable of configuring the CMU via MCU configuration data stored in the second configuration memory to perform at least one user-defined MCU function. In one aspect, upon identifying a function of a configurable MCU for facilitating network interface between a host and an external device based on a first interface protocol, the process is capable of searching or online searching a first bit map or bitstream for programming CMU to perform the first embedded function. In one embodiment, after downloading the first bit map from a cloud system to the second configuration memory, the CMU is programmed in response to the first bit map.

It should be noted that the embedded function includes I²C and/or UART interface function(s) for communicating with at least one external device. The process is further able to search a new bit map or bitstream associated with identified function for programming CMU if the first bit map fails to verify the first embedded function. After identifying a second function of CMU for facilitating network interface based on a second interface protocol, the second bit map is downloaded from the cloud system to the second configuration memory via the communication network. The process, in one aspect, continues to configure CMU until CMU is capable of performing user-defined MCU functions.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A semiconductor apparatus containing at least one programmable device for providing digital network communication, comprising:

a field-programmable gate array ("FPGA"), configured by a stream of FPGA configuration data during a phase I configuration, containing a plurality of configurable logic blocks ("LBs") able to be selectively programmed to perform one or more user-defined logic function; and a configurable microcontroller ("CM"), configured by a stream of CM configuration data during a phase II configuration, coupled to the FPGA and configured to be programmed to handle a first interface protocol of inter-integrated circuit ("I2C") and second interface protocol of two-wire interface ("TWI") for facilitating communication between a plurality of input and output ("I/O") ports and an external device in accordance with interface programming microcode.

2. The apparatus of claim 1, wherein the CM is configured to be programmable to one or more interface blocks for handling I/O interface protocol of serial peripheral interface ("SPI") for facilitating I/O interface.

3. The apparatus of claim 1, further comprising a processor configured to communicate with a host central processing unit ("CPU") based on a set of predefined instruction code.

4. The apparatus of claim 1, further comprising a memory coupled to the FPGA and configured to store predefined programming microcode downloadable from a cloud system.

5. The apparatus of claim 4, wherein the memory includes a flash memory for storing downloaded bitmaps from a remote location via a communication network.

6. The apparatus of claim 4, wherein the memory includes a static random-access memory ("SRAM") for storing data.

7. The apparatus of claim 4, wherein at least a portion of the memory is configured to store information indicating one of a single port and a dual port operation in accordance with memory programmable-code.

8. The apparatus of claim 1, wherein the plurality of I/O ports is configured to couple to multiple external devices.

9. The apparatus of claim 1, wherein the CM includes multiple programmable interfaces configured to facilitate communication between the plurality of I/O ports and one or more external devices in accordance with programming microcode.

10. The apparatus of claim 1, wherein the CM is configured to be programmable to one or more interface blocks for handling I/O interface protocol of universal asynchronous receiver-transmitter ("UART") for facilitating I/O interface.

11. The apparatus of claim 1, wherein the CM is configured to be programmable to one or more interface blocks for handling I/O interface protocol of Integer ("Int") interface protocol to facilitate communication between the plurality of I/O ports and one or more external devices in accordance with a set of predefined programming microcode.

12. The apparatus of claim 1, wherein the CM is configured to be programmable to one or more interface blocks for handling I/O interface protocol of two-wire interface ("TWI") protocol to facilitate communication.

13. The apparatus of claim 1, wherein the CM is configured to be programmable to one or more interface blocks for handling I/O interface protocol of Timer interface protocol to facilitate communication.

14. A method for providing network communication utilizing at least one programmable device comprising:

obtaining a first configuration bit stream from a first memory;

configuring a plurality of configurable logic blocks ("LBs") in a field-programmable gate array ("FPGA") based on the first configuration bit stream during a phase I configuration for performing one or more user-defined logic function;

obtaining a second configuration bit stream from a second memory; and programming a configurable microcontroller ("CM") in response to the second configuration bit stream during a phase II configuration to handle a first interface protocol of inter-integrated circuit ("I2C") and second interface protocol of two-wire interface ("TWI") for facilitating communication between input and output ("I/O") ports of the CM and one or more external devices.

15. The method of claim 14, further comprising programming the CM to handle I/O interface protocol of serial peripheral interface ("SPI") for facilitating I/O interface.

16. The method of claim 14, further comprising programming the CM to handle I/O interface protocol of universal asynchronous receiver-transmitter ("UART") for facilitating I/O interface.

17. The method of claim 14, wherein configuring FPGA further includes configuring a portion of the FPGA in accordance with first configuration data retrieved from a first configuration memory to behave as a configurable MCU emulating a processor function.

18. The method of claim 14, wherein programming the CM further includes configuring the CM in response to a second configuration data retrieved from a second configuration memory to perform at least one user-defined microcontroller unit ("MCU") function.

19. The method of claim 14, further comprising receiving first configuration data from a first external storage location via a communication bus.

20. The method of claim 14, further comprising storing the first configuration data in the first configuration memory for configuring FPGA to contain a configurable MCU.

21. An apparatus for providing network communication utilizing at least one programmable device comprising:

means for obtaining a first configuration bit stream from a first memory;

means for configuring a plurality of configurable logic blocks ("LBs") in a field-programmable gate array ("FPGA") based on the first configuration bit stream during a phase I configuration for performing one or more user-defined logic function;

means for obtaining a second configuration bit stream from a second memory; and means for programming a configurable microcontroller ("CM") in response to the second configuration bit stream during a phase II configuration to handle a first interface protocol of inter-integrated circuit ("I2C") and second interface protocol of two-wire interface ("TWI") for facilitating communication between input and output ("I/O") ports of the CM and one or more external devices.

22. The apparatus of claim 21, further comprising means for programming the CM to handle I/O interface protocol of serial peripheral interface ("SPI") for facilitating I/O interface.

* * * * *